US011863952B2

(12) United States Patent
Li

(10) Patent No.: US 11,863,952 B2
(45) Date of Patent: *Jan. 2, 2024

(54) SOUND CAPTURE FOR MOBILE DEVICES

(71) Applicant: Dolby Laboratories Licensing Corporation, San Francisco, CA (US)

(72) Inventor: Chunjian Li, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,385

(22) Filed: Nov. 2, 2022

(65) Prior Publication Data

US 2023/0055257 A1 Feb. 23, 2023

Related U.S. Application Data

(63) Continuation of application No. 15/999,733, filed as application No. PCT/US2017/018174 on Feb. 16, 2017, now Pat. No. 11,722,821.

(Continued)

(30) Foreign Application Priority Data

Feb. 19, 2016 (WO) ................ PCT/CN2016/074104
Mar. 23, 2016 (EP) .................................... 16161827

(51) Int. Cl.

| | |
|---|---|
| ***H04R 5/027*** | (2006.01) |
| ***H04R 1/26*** | (2006.01) |
| ***H04R 5/04*** | (2006.01) |
| ***H04R 29/00*** | (2006.01) |
| ***H04R 3/00*** | (2006.01) |

(52) U.S. Cl.

CPC ............ *H04R 5/027* (2013.01); *H04R 1/265* (2013.01); *H04R 5/04* (2013.01); *H04R 29/005* (2013.01)

(58) Field of Classification Search

None

See application file for complete search history.

(56) References Cited

U.S. PATENT DOCUMENTS 9,131,305 B2 9/2015 Li
2002/0041695 A1 4/2002 Luo (Continued)

FOREIGN PATENT DOCUMENTS

EP 2608131 4/2014
WO 2014032709 A1 3/2014
WO 2015066062 5/2015

OTHER PUBLICATIONS http://videoandfilmaker.com/wp/index.php/newgear/hooked-3d-sound/ www.hookeaudio.com.

*Primary Examiner* — Qin Zhu

(57) ABSTRACT

Audio signals from microphones of a mobile device are received. Each audio signal is generated by a respective microphone of the microphones. First microphones are selected from among the microphones to generate a front audio signal. Second microphones are selected from among the microphones to generate a back audio signal. A first audio signal portion, which is determined based at least in part on the back audio signal, is removed from the front audio signal to generate a modified front audio signal. A second audio signal portion is removed from the modified front audio signal to generate a left-front audio signal. A third audio signal portion is removed from the modified front audio signal to generate a right-front audio signal.

20 Claims, 10 Drawing Sheets

Related U.S. Application Data

(60) Provisional application No. 62/309,370, filed on Mar. 16, 2016.

(56) References Cited

U.S. PATENT DOCUMENTS

| | | | |
|---|---|---|---|
| 2004/0076301 | A1 | 4/2004 | Algazi |
| 2011/0317041 | A1 | 12/2011 | Zurek |
| 2012/0013768 | A1 | 1/2012 | Zurek |
| 2013/0315402 | A1 | 11/2013 | Visser et al. |
| 2015/0003623 | A1 | 1/2015 | Rasmussen |
| 2015/0016641 | A1 | 1/2015 | Ugur |
| 2015/0063577 | A1 | 3/2015 | Song |
| 2015/0110275 | A1 | 4/2015 | Tammi |
| 2015/0256950 | A1 | 9/2015 | Shilton |
| 2016/0005408 | A1 | 1/2016 | Visser |
| 2016/0044410 | A1 | 2/2016 | Mäkinen |

SOUND CAPTURE FOR MOBILE DEVICES

CROSS-REFERENCE TO RELATED APPLICATIONS

This application is a continuation of U.S. patent application Ser. No. 15/999,733 filed on Aug. 20, 2018, which is the U.S. national stage of International Patent Application No. PCT/US2017/018174, filed Feb. 16, 2017, which in turn claims priority to European patent application Ser. No. 16161827.7, filed Mar. 23, 2016, U.S. Provisional Patent Application No. 62/309,370, filed Mar. 16, 2016, and International Patent Application No. PCT/CN2016/074104, filed Feb. 19, 2016, the contents of all of which are incorporated herein by reference in their entireties. The applicant(s) hereby rescind any disclaimer of claim scope in the parent application(s) or the prosecution history thereof and advise the USPTO that the claims in this application may be broader than any claim in the parent application(s).

TECHNOLOGY

Example embodiments disclosed herein relate generally to processing audio data, and more specifically to sound capture for mobile devices.

BACKGROUND

Binaural audio recordings capture sound in a way similar to how the human auditory system captures sound. To generate audio signals in binaural audio recordings, microphones can be placed in the ears of a manikin or a real person. Compared to the conventional stereo recordings, binaural recordings include in the signal the Head Related Transfer Function (HRTF) of the manikin and thus provide a more realistic directional sensation. More specifically, when played back using headphones, binaural recordings sound more external than conventional stereo, which sound as if the sources lie within the head. Binaural recordings also let the listener discriminate front and back more easily, since it mimics the effect of the human pinna (outer ear). The pinna effect enhances intelligibility of sounds originated from the front, by boosting sounds from the front while dampening sounds from the back (for 2000 Hz and above).

Many mobile devices such as mobile phones, tablets, laptops, wearable computing devices, etc., have microphones. Audio recording capabilities and spatial positions of these microphones are quite different from those of microphones of a binaural recording system. Microphones on mobile devices are typically used to make monophonic audio recordings, not binaural audio recordings.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The example embodiments illustrated by way of example, and not by way of limitation, in the figures of the accompanying drawings and in which like reference numerals refer to similar elements and in which.

DESCRIPTION OF EXAMPLE EMBODIMENTS

Figure 1A:
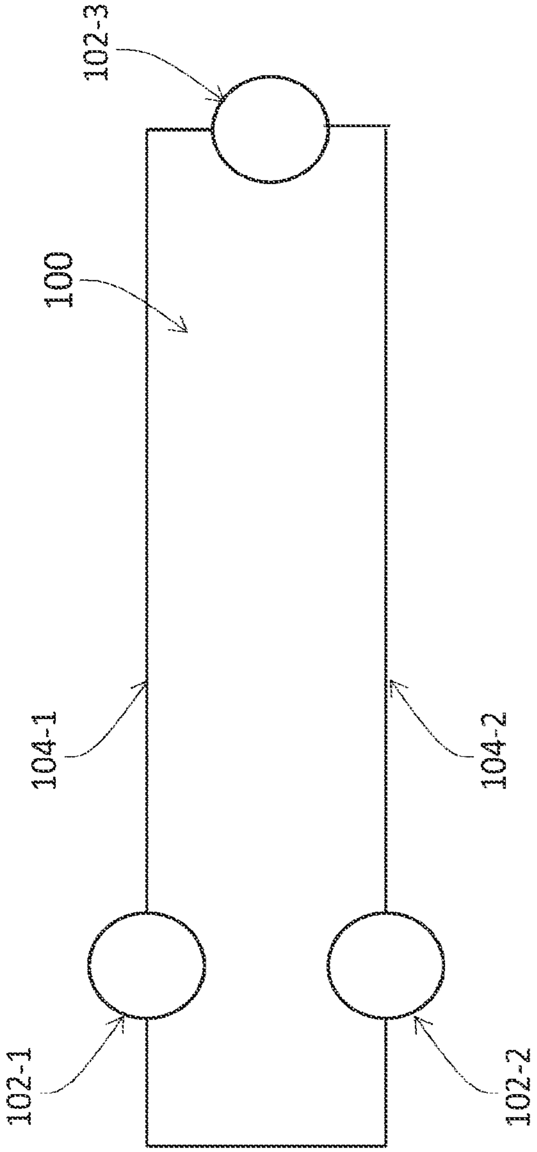
FIG. 1A through FIG. 1C illustrate example mobile devices with a plurality of microphones in accordance with example embodiments described herein.

Example embodiments, which relate to sound capture for mobile devices, are described herein. In the following description, for the purposes of explanation, numerous specific details are set forth in order to provide a thorough understanding of the example embodiments. It will be apparent, however, that the example embodiments may be practiced without these specific details. In other instances, well-known structures and devices are not described in exhaustive detail, in order to avoid unnecessarily occluding, obscuring, or obfuscating the example embodiments.

Example embodiments are described herein according to the following outline:

1. GENERAL OVERVIEW
2. AUDIO PROCESSING
3. EXAMPLE MICROPHONE CONFIGURATIONS
4. EXAMPLE OPERATIONAL SCENARIOS
5. EXAMPLE BEAM FORMING
6. AUDIO GENERATOR
7. EXAMPLE PROCESS FLOW
8. IMPLEMENTATION MECHANISMS—HARDWARE OVERVIEW
9. EQUIVALENTS, EXTENSIONS, ALTERNATIVES AND MISCELLANEOUS

1. GENERAL OVERVIEW

This overview presents a basic description of some aspects of the example embodiments described herein. It should be noted that this overview is not an extensive or exhaustive summary of aspects of the example embodiments. Moreover, it should be noted that this overview is not intended to be understood as identifying any particularly significant aspects or elements of the embodiment, nor as delineating any scope of the embodiment in particular, nor in general. This overview merely presents some concepts that relate to the example embodiment in a condensed and simplified format, and should be understood as merely a conceptual prelude to a more detailed description of example embodiments that follows below.

Example embodiments described herein relate to audio processing. A plurality of audio signals from a plurality of microphones of a mobile device is received. Each audio signal in the plurality of audio signals is generated by a respective microphone in the plurality of microphones. One or more first microphones are selected from among the plurality of microphones to generate a front audio signal, i.e. the audio signals received from said one or more first microphones is selected as a front audio signal. One or more second microphones are selected from among the plurality of microphones to generate a back audio signal, i.e. the audio signal received from said one or more second microphones is selected as a back audio signal. A first audio signal portion is removed from the front audio signal to generate a modified front audio signal. The first audio signal portion is determined based at least in part on the back audio signal. A first spatially filtered audio signal formed by two or more audio signals of two or more third microphones in the plurality of audio signals is used to remove a second audio signal portion from the modified front audio signal to generate a right-front audio signal. A second spatially filtered audio signal formed by two or more audio signals of two or more fourth microphones in the plurality of audio signals is used to remove a third audio signal portion from the modified front audio signal to generate a left-front audio signal. The right-front audio signal and left-front audio signal may be used to generate e.g. a stereo audio signal, a surround audio signal or a binaural audio signal. For example, during the playback using headphones, the left-front signal is fed to the left channel of the headphone, and the right-front signal is fed to the right channel. For sounds originated in the front direction, it is present in both ears of the listener, whereas for sounds originated in the left direction, for example, it is present in the left channel but in the right channel it is dampened a lot. Therefore, the front source is enhanced by 6 dB compared to the left or right sources, similar as the head shadowing effect in binaural audio. For sounds originated from the back, it is dampened by the first audio signal portion removal, and thus making the sounds in the front more intelligible and the listener easier to discriminate front and back direction, similar as the pinna effect in binaural audio.

In some example embodiments, mechanisms as described herein form a part of a media processing system, including, but not limited to, any of: an audio video receiver, a home theater system, a cinema system, a game machine, a television, a set-top box, a tablet, a mobile device, a laptop computer, netbook computer, desktop computer, computer workstation, computer kiosk, various other kinds of terminals and media processing units, and the like.

Various modifications to the preferred embodiments and the generic principles and features described herein will be readily apparent to those skilled in the art. Thus, the disclosure is not intended to be limited to the embodiments shown, but is to be accorded the scope as defined by the claims.

Any of embodiments as described herein may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

2. AUDIO PROCESSING

Techniques as described herein can be applied to support audio processing by microphone layouts seen on most mobile phones and tablets, i.e., a front microphone, a back microphone, and a side microphone. These techniques can be implemented by a wide variety of computing devices including but not limited to consumer computing devices, end user devices, mobile phones, handsets, tablets, laptops, desktops, wearable computers, display devices, cameras, etc.

Spatial cues related to the head shadow effect and the pinna effect are represented or preserved in binaural audio signals. Roughly speaking, the head shadow effect attenuates sound as represented in the left channel of a binaural audio signal, if the source for the sound is located at the right side. Conversely, the head shadow effect attenuates sound as represented in the right channel of a binaural audio signal, if the source for the sound is located at the left side. For sounds from front and back, the head shadow effect may not make a difference. The pinna effect helps distinguish between sound from front and sound from back by attenuating the sound from back, while enhancing the sound from front.

Techniques as described herein can be applied to use microphones of a mobile device to capture left-front audio signals and right-front audio signals that mimic the human ear characteristics, similar to binaural recordings. As multiple microphones are ubiquitously included as integral parts of mobile devices, these techniques can be widely used by the mobile devices to make audio processing (e.g., similar to binaural audio recordings) without any need for the use of specialized binaural recording devices and accessories.

Under techniques as described herein, a first beam may be formed towards the left-front direction, whereas a second beam may be formed towards the right-front direction based on multiple microphones of a mobile device (or more generally a computing device). The audio signal output from the left-front beam may be used as the left channel audio signal in an enhanced stereo audio signal (or a stereo mix), whereas the audio signal output from the right-front beam may be used as the right channel audio signal in the enhanced stereo audio signal (or the stereo mix). As sounds from the left side are attenuated by the right-front beam, and as sounds from the right side is attenuated by the left-front beam, the head shadowing effect is emulated in the right and left channel audio signals. Since the right-front beam and the left-front beam overlap in the front direction, this ensures sound from the front side is identically present in both the left and right channel audio signals. Thus, the front sound, present in both the right and left channel, is perceived by a listener as louder by about 6 dB as compared with the left sound and the right sound. Furthermore, sound from the back side can be attenuated in these channels. This provides a similar effect to that of the human pinna, which can be used to perceptually differentiate between sound from the front side and sound from the back side. The pinna effect thus also reduces interference from the back, helping focus to the front source.

The right-front and left-front beams (or beam patterns) can be made by linear combinations of audio signals acquired by the multiple microphones on the mobile device. In some embodiments, benefits such as front focus (or front sound enhancement), back sound suppression (or suppression of interference from the back side) can be obtained while a relatively broad sound field for the front hemisphere is maintained.

3. EXAMPLE MICROPHONE CONFIGURATIONS

Audio processing techniques as described herein can be implemented in a wide variety of system configurations of mobile devices in which microphones may be configured spatially for other purposes. By way of examples but not limitation, FIG. 1A through FIG. 1C illustrate example mobile devices (e.g., 100, 100-1, 100-2) that include pluralities of microphones (e.g., three microphones, four microphones) as system components of the mobile devices (e.g., 100, 100-1, 100-2), in accordance with example embodiments as described herein.

Figure 1B:
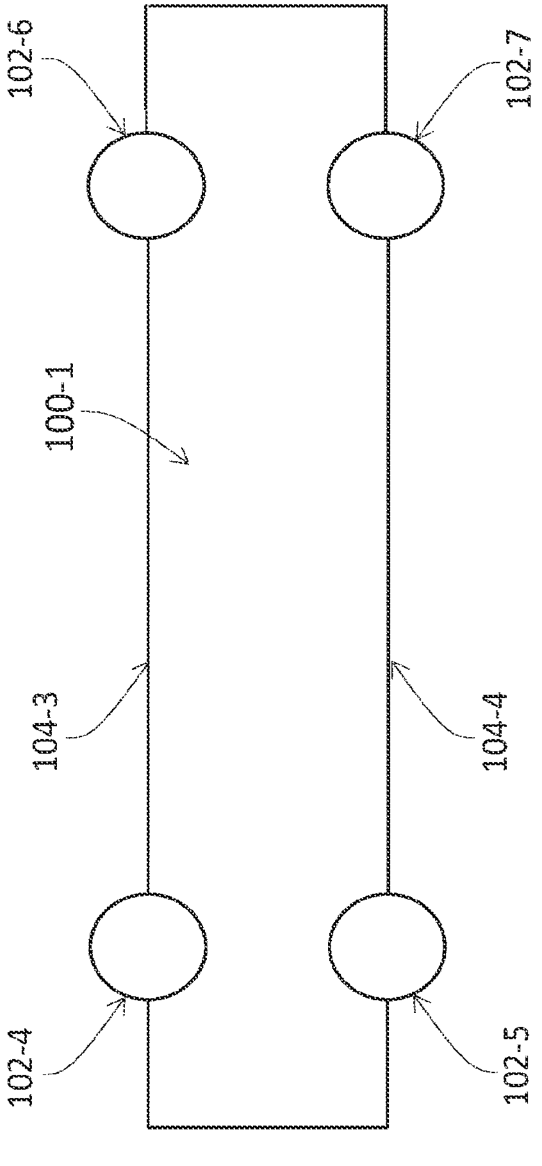
Figure 1C:
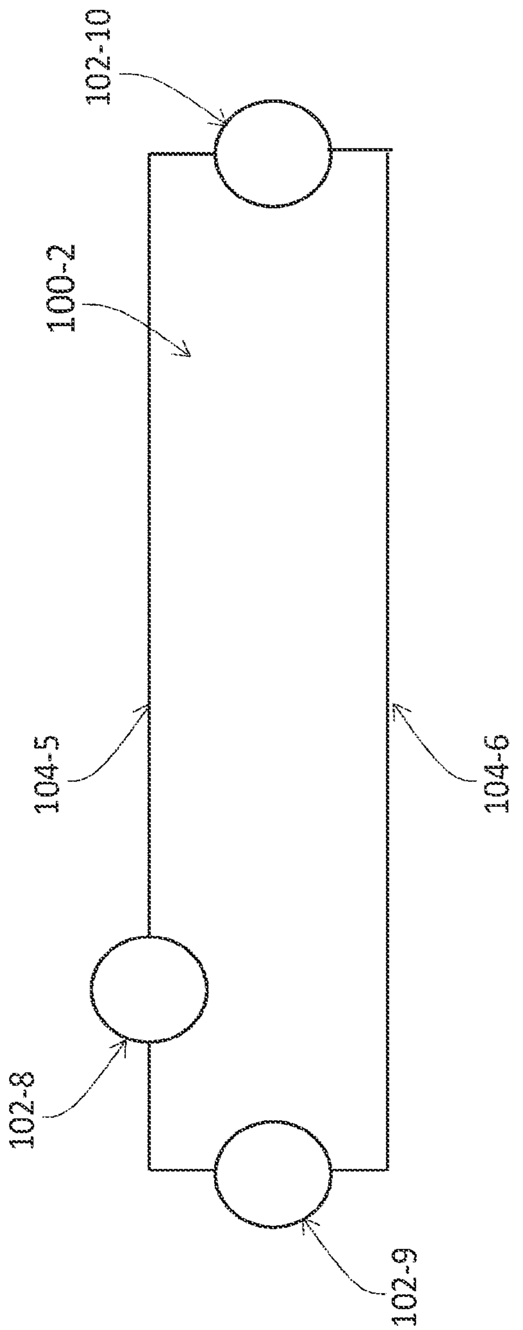

In an example embodiment as illustrated in FIG. 1A, the mobile device (100) may have a device physical housing (or a chassis) that includes a first plate 104-1 and a second plate 104-2. The mobile device (100) can be manufactured to contain three (built-in) microphones 102-1, 102-2 and 102-3, which are disposed near or inside the device physical housing formed at least in part by the first plate (104-1) and the second plate (104-2).

The microphones (102-1 and 102-2) may be located on a first side (e.g., the left side in FIG. 1A) of the mobile device (100), whereas the microphone (102-3) may be located on a second side (e.g., the right side in FIG. 1A) of the mobile device (100). In an embodiment, the microphones (102-1, 102-2 and 102-3) of the mobile device (100) are disposed in spatial locations that do not represent (or do not resemble) spatial locations corresponding to ear positions of a manikin (or a human) In the example embodiment as illustrated in FIG. 1A, the microphone (102-1) is disposed spatially near or at the first plate (104-1); the microphone (102-2) is disposed spatially near or at the second plate (104-2); the microphone (102-3) is disposed spatially near or at an edge (e.g., on the right side of FIG. 1A) away from where the microphones (102-1 and 102-2) are located.

Examples of microphones as described herein may include, without limitation, omnidirectional microphones, cardioid microphones, boundary microphones, noise-canceling microphones, microphones of different directionality characteristics, microphones based on different physical responses, etc. The microphones (102-1, 102-2 and 102-3) on the mobile device (100) may or may not be the same microphone type. The microphones (102-1, 102-2 and 102-3) on the mobile device (100) may or may not have the same sensitivity. In an example embodiment, each of the microphones (102-1, 102-2 and 102-3) represents an omnidirectional microphone. In an embodiment, at least two of the microphones (102-1, 102-2 and 102-3) represent two different microphone types, two different directionalities, two different sensitivities, and the like.

In an example embodiment as illustrated in FIG. 1B, the mobile device (100-1) may have a device physical housing that includes a third plate 104-3 and a fourth plate 104-4. The mobile device (100-1) can be manufactured to contain four (built-in) microphones 102-4, 102-5, 102-6 and 102-7, which are disposed near or inside the device physical housing formed at least in part by the third plate (104-3) and the fourth plate (104-4).

The microphones (102-4 and 102-5) may be located on a first side (e.g., the left side in FIG. 1B) of the mobile device (100-1), whereas the microphones (102-6 and 102-7) may be located on a second side (e.g., the right side in FIG. 1B) of the mobile device (100-1). In an embodiment, the microphones (102-4, 102-5, 102-6 and 102-7) of the mobile device (100-1) are disposed in spatial locations that do not represent (or do not resemble) spatial locations corresponding to ear positions of a manikin (or a human) In the example embodiment as illustrated in FIG. 1B, the microphones (102-4 and 102-6) are disposed spatially in two different spatial locations near or at the third plate (104-3); the microphones (102-5 and 102-7) are disposed spatially in two different spatial locations near or at the fourth plate (104-4).

The microphones (102-4, 102-5, 102-6 and 102-7) on the mobile device (100-1) may or may not be the same microphone type. The microphones (102-4, 102-5, 102-6 and 102-7) on the mobile device (100-1) may or may not have the same sensitivity. In an example embodiment, the microphones (102-4, 102-5, 102-6 and 102-7) represent omnidirectional microphones. In an example embodiment, at least two of the microphones (102-4, 102-5, 102-6 and 102-7) represent two different microphone types, two different directionalities, two different sensitivities, and the like.

In an example embodiment as illustrated in FIG. 1C, the mobile device (100-2) may have a device physical housing that includes a fifth plate 104-5 and a sixth plate 104-6. The mobile device (100-2) can be manufactured to contain three (built-in) microphones 102-8, 102-9 and 102-10, which are disposed near or inside the device physical housing formed at least in part by the fifth plate (104-5) and the sixth plate (104-6).

The microphone (102-8) may be located on a first side (e.g., the top side in FIG. 1C) of the mobile device (100-2); the microphones (102-9) may be located on a second side (e.g., the left side in FIG. 1C) of the mobile device (100-2); the microphones (102-10) may be located on a third side (e.g., the right side in FIG. 1C) of the mobile device (100-2). In an embodiment, the microphones (102-8, 102-9 and 102-10) of the mobile device (100-2) are disposed in spatial locations that do not represent (or do not resemble) spatial locations corresponding to ear positions of a manikin (or a human) In the example embodiment as illustrated in FIG. 1C, the microphone (102-8) is disposed spatially in a spatial location near or at the fifth plate (104-5); the microphones (102-9 and 102-10) are disposed spatially in two different spatial locations near or at two different interfaces between the fifth plate (104-5) and the sixth plate (104-6), respectively.

The microphones (102-8, 102-9 and 102-10) on the mobile device (100-2) may or may not be the same microphone type. The microphones (102-8, 102-9 and 102-10) on the mobile device (100-2) may or may not have the same sensitivity. In an example embodiment, the microphones (102-8, 102-9 and 102-10) represent omnidirectional microphones. In an example embodiment, at least two of the microphones (102-8, 102-9 and 102-10) represent two different microphone types, two different directionalities, two different sensitivities, and the like.

4. EXAMPLE OPERATIONAL SCENARIOS

Under techniques as described herein, left-front audio signals and right-front audio signals can be made with microphones (e.g., 102-1, 102-2 and 102-3 of FIG. 1A; 102-4, 102-5, 102-6 and 102-7 of FIG. 1B; 102-8, 102-9 and 102-10 of FIG. 1C) of a mobile device (e.g., 100 of FIG. 1A, 100-1 of FIG. 1B, 100-2 of FIG. 1C) in any of a variety of possible operational scenarios.

Figure 2A:
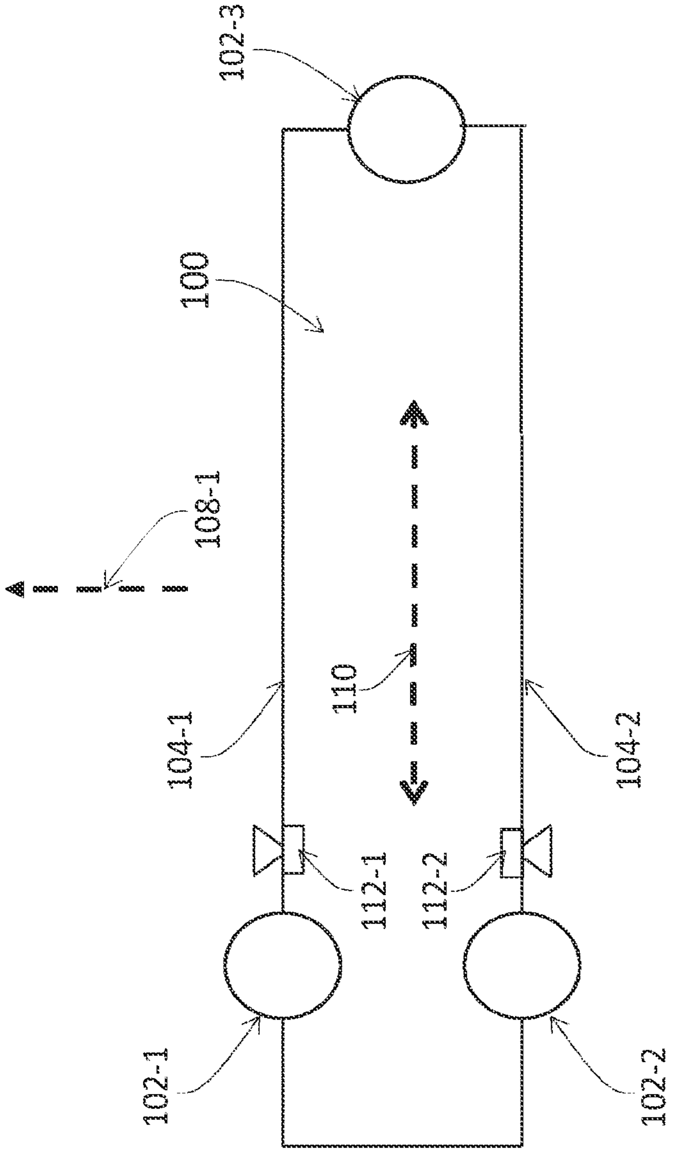
FIG. 2A through FIG. 2D illustrate example operational modes in accordance with example embodiments described herein.
Figure 2B:
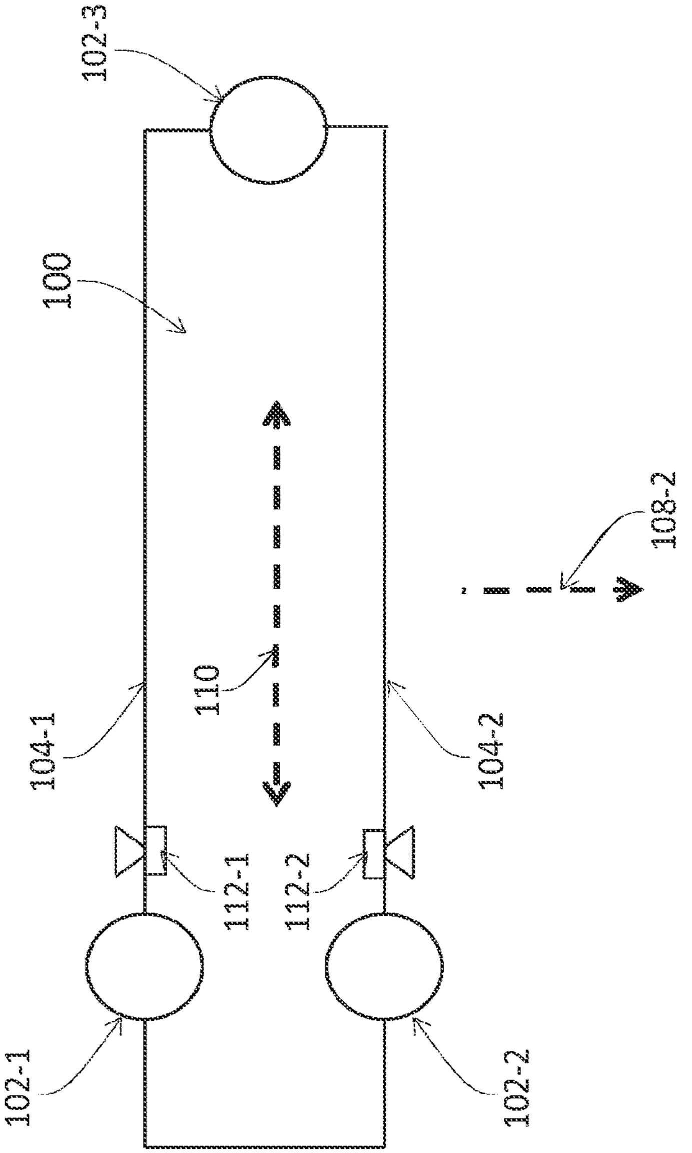

In an embodiment, a mobile device (e.g., 100 of FIG. 1A, 100-1 of FIG. 1B, 100-2 of FIG. 1C) as described herein may include an audio generator (e.g., 300 of FIG. 3), which implements some or all of the techniques as described herein. In some operational scenarios as illustrated in FIG. 2A and FIG. 2B, the mobile device (for the purpose of illustration only, 100 of FIG. 1A) may be operated by a user to record video and audio.

The mobile device (100), or the physical housing thereof, may be of any form factor among a variety of form factors that vary in terms of sizes, shapes, styles, layouts, sizes and positions of physical components, or other spatial properties.

For example, the mobile device (100) may be of a spatial shape (e.g., a rectangular shape, a slider phone, a flip phone, a wearable shape, a head-mountable shape) that has a transverse direction 110. In an embodiment, the transverse direction (110) of the mobile phone (100) may correspond to a direction along which the spatial shape of the mobile device (100) has the largest spatial dimension size.

The mobile device (100) may be equipped with two cameras 112-1 and 112-2 respectively on a first side represented by the first plate (104-1) and on a second side represented by the second plate (104-2). Additionally, optionally, or alternatively, the mobile device (100) may be equipped with an image display (not shown) on the second side represented by the second plate (104-2).

Based on a specific operational mode (of the mobile device), into which the mobile device enters for audio recording (and possibly video recording at the same time), the audio generator (300) of the mobile device (100) may select a specific spatial direction, from among a plurality of spatial directions (e.g., top, left, bottom and right directions of FIG. 2A or FIG. 2B), to represent a front direction (e.g., 108-1 of FIG. 2A, 108-2 of FIG. 2B) for the microphones (102-1, 102-2 and 102-3). In an embodiment, the front direction (108-1 or 108-2) may correspond to, or may be determined as, a central direction of one or more specific cameras of the mobile device (100) that are used for video recording in the specific operational mode.

In example operational scenarios as illustrated in FIG. 2A, in response to receiving a first request for audio recording (and possibly video recording at the same time), the mobile device (100) may enter a first operational mode for audio recording (and possibly video recording at the same time). The first request for audio recording (and possibly video recording at the same time) may be generated based on first user input (e.g., selecting a specific recording function), for example, through a tactile user interface such as a touch screen interface (or the like) implemented on the mobile device (100).

In an embodiment, in the first operational mode, the mobile device (100) uses the camera (112-1) at or near the first plate (104-1) to acquire images for video recording and the microphones (102-1, 102-2 and 102-3) to acquire audio signals for concurrent audio recording.

Based on the first operational mode in which the camera (112-1) is used to capture imagery information, the mobile device (100) establishes, or otherwise determines, that the top direction of FIG. 2A, from among the plurality of spatial directions of the mobile device (100), to represent the front direction (108-1) for the first operational mode. Additionally, optionally, or alternatively, the mobile device (100) may receive user input that specifies the top direction of FIG. 2A, from among the plurality of spatial directions of the mobile device (100), as the front direction (108-1) for the first operational mode.

In an embodiment, the mobile device (100) receives audio signals from the microphones (102-1, 102-2 and 102-3). Each of the microphones (102-1, 102-2 and 102-3) may generate one of the audio signals.

In an embodiment, the mobile device (100) selects a specific microphone from among the microphones (102-1, 102-2 and 102-3) as a front microphone in the microphones (102-1, 102-2 and 102-3). The mobile device (100) may select the specific microphone as the front microphone based on more or more selection factors. These selection factors may include, without limitation, response sensitivities of the microphones, directionalities of the microphones, locations of the microphones, and the like. For example, based at least in part on the front direction (108-1), the mobile device (100) may select the microphone (102-1) as the front microphone. The audio signal as generated by the selected front microphone (102-1) may be designated or used as a front audio signal.

In an embodiment, the mobile device (100) selects another specific microphone (other than the front microphone, which is 102-1 in the present example) from among the microphones (102-1, 102-2 and 102-3) as a back microphone in the microphones (102-1, 102-2 and 102-3). The mobile device (100) may select the other specific microphone as the back microphone based on more or more other selection factors. These selection factors may include, without limitation, response sensitivities of the microphones, directionalities of the microphones, locations of the microphones, spatial relations of the microphones relative to the front microphone, and the like. For example, based at least in part on the microphone (102-1) being selected as the front microphone, the mobile device (100) may select the microphone (102-2) as the back microphone. The audio signal as generated by the selected back microphone (102-2) may be designated or used as a back audio signal.

The audio signals as generated by the microphones (102-1, 102-2 and 102-3) may include audio content from various sound sources. Any of these sound sources may be located in any spatial direction relative to the orientation (e.g., as represented by the front direction (108-1) in the present example) of the mobile device (100). For the purpose of illustration only, some of the audio content as recorded in the audio signals generated by the microphones (102-1, 102-2 and 102-3) may be contributed/emitted from back sound sources located in the back direction (e.g., the bottom direction of FIG. 2A) of the mobile device (100).

In an embodiment, the mobile device (100) uses the back audio signal generated by the back microphone (102-2) to remove a first audio signal portion from the front audio signal to generate a modified front audio signal. The first audio signal portion that is removed from the front audio signal represents, or substantially includes (e.g., 30% or more, 40% or more, 50% or more, 60% or more, 70% or more, 80% or more, 90% or more), audio content from the back sound sources. In an embodiment, the mobile device (100) may set the first audio signal portion to be a product of the back audio signal and a back-to-front transfer function.

In the context of the invention, applying a transfer function to an input audio signal may comprise forming a z-transform of the time domain input audio signal, multiplying the resulting z-domain input audio signal with the transfer function, and transforming the resulting z-domain output signal back to the time domain, to obtain a time domain output signal. Alternatively, the impulse response is formed, e.g. by taking the inverse z-transform of the transfer function or by directly measuring the impulse response, and the input audio signal represented in the time domain is convoluted with the impulse response to obtain the output audio signal represented in the time domain.

As used herein, a back-to-front transfer function measures the difference or ratio between audio signal responses of a front microphone and audio signal responses of a back microphone, in response to sound emitted by a sound source located in the back side (e.g., below the second plate (104-2) of FIG. 2A in the present example) relative to a front direction (108-1 of FIG. 2A in the present example). The back-to-front transfer function may be a device-specific function of frequencies, spatial directions, etc. The back-to-front transfer function may be determined in real time, in non-real time, in device design time, in device assembly time, in device calibration time before or after the device reaches or is released to an end user, etc.

In an embodiment, the back-to-front transfer function may be determined or generated beforehand, or before (e.g., actual, user-directed) left-front and right-front audio signals are made or generated by the mobile device (100). The back-to-front transfer function may be determined as a difference (in a logarithmic domain) or a ratio (in a linear domain or a non-logarithmic domain) between a first audio signal generated by the front microphone (102-1) in response to sound emitted by a test back sound source and a second audio signal generated by the back microphone (102-2) in response to the same sound emitted by the test back sound source.

As the microphone (102-1) sits on or near the first plate (104-1) facing the front direction (108-1) and the microphone (102-2) sits on or near the second plate (104-2) facing the opposite direction, these two microphones (102-1 and 102-2) have different directionalities pointing to the front and back directions respectively. Accordingly, for the same test back sound source, the two microphones (102-1 and 102-2) generate different audio signal responses respectively, for example, due to device body shadowing.

Some or all of a variety of measurements of audio signal responses the two microphones (102-1 and 102-2) can be made under techniques as described herein. For example, a test sound signal (e.g., with different frequencies) may be played at one or more spatial locations from the back of the mobile device (100). Audio signal responses from the two microphones (102-1 and 102-2) may be measured. The back-to-front transfer function (denoted as $H_{21}(z)$) from the microphone (102-2) to the microphone (102-1) may be determined based on some or all of the audio signal responses as measured in response to the test sound signal. For example, $H_{21}(z)$ may be determined from the audio signal response of a front microphone and a back microphone to a test sound source played at from the back of the mobile device as: $H_{21}(z)=m_1'(z)/m_2'(z)$, wherein $m_1'(z)$ is the z-transform of the response audio signal of the front microphone to the test sound source and $m_2'(z)$ is the z-transform of the response audio signal of the back microphone to the test sound source.

In the operational scenarios as illustrated in FIG. 2A, the mobile device uses $H_{21}(z)$, along with the back audio signal generated by the back microphone (102-2), to cancel or remove sounds from the back sound sources in the front audio signal generated by the front microphone (102-1), as follows:

$$S_f=m_1-m_2*H_{21}(z) \quad (1)$$

where $m_1$ represents the front microphone signal (or the front audio signal generated by the microphone (102-1)), $m_2$ represents the back microphone signal (or the back audio signal generated by the microphone (102-2)), and $S_f$ represents the modified front microphone signal. Ideally, the sound from the back sound sources is completely removed while the sound from front sound sources (located in the top direction of FIG. 2A is only slightly colored or distorted. This is because the sound from the front sound sources may contribute a relatively small audio signal portion to the back audio signal. In an embodiment, the sound from the front source sources is attenuated by a significant amount (e.g., about 10 dB, about 12 dB, about 8 dB) by the device body shadowing when the sound from the front sources reaches the back microphone (102-2). When the back audio signal is matched to the audio signal portion to be removed from the front audio signal in a back sound cancelling process as represented by expression (1) above, the relatively small audio signal portion contributed by the sound from the front sound sources to the back audio signal is again attenuated by a significant amount (e.g., about 10 dB, about 12 dB, about 8 dB). Thus the cancelling process causes only a relatively small copy of the front signal to be added to the front signal. As a result, the modified front audio signal can be generated under the techniques as described with little coloring or distortion.

In an embodiment, the modified front audio signal obtained after the back sound cancelling process represents a front beam that covers the front hemisphere (above the first plate (104-1) of FIG. 2A). Subsequently, a left sound cancelling process may be applied to cancel sounds from the left side in the front beam represented by the modified front audio signal to get a first beam with a right-front focus; the first beam with the right-front focus can then be designated as a right channel audio signal of an output audio signal, e.g. a right channel of a stereo output audio signal or a right surround channel of a surround output audio signal or a right channel of a surround output audio signal. Similarly, a right sound cancelling process may be applied to cancel sounds from the right side in the front beam represented by the modified front audio signal to get a second beam with a left-front focus; the beam with the left-front focus can then be designated as a left channel audio signal of the output audio signal. It should be noted that in various embodiments, some or all of sound cancelling processes as described herein can be performed concurrently, serially, partly concurrently, or partly serially. Additionally, optionally, or alternatively, some or all of sound cancelling processes as described herein can be performed in any of one or more different orders.

As used herein, a beam or a beam pattern may refer to a directional response pattern formed by spatially filtering (audio signals generated based on response patterns of) two or more microphones. In an embodiment, a beam may refer to a fixed beam, or a beam that is not dynamically steered, with fixed directionality, gain, sensitivity, side lobes, main lobe, beam width in terms of angular degrees, and the like for given audio frequencies.

In an embodiment, for the purpose of applying the left and right sound cancelling processes as mentioned above, the mobile device (100) determines each of left and right spatial directions, for example, in reference to the orientation of the mobile device (100) and the front direction (108-1). In an embodiment, the orientation of the mobile device (100) may be determined using specific sensors (e.g., orientation sensors, accelerometer, geomagnetic field sensor, and the like) of the mobile device (100).

In an embodiment, the mobile device (100) applies a first spatial filter to audio signals generated by the microphones (102-1, 102-2 and 102-3). The first spatial filter causes the microphones (102-1, 102-2 and 102-3) to form a beam of directional sensitivities focusing around the left spatial direction. By way of example but not limitation, the beam may be represented by a first bipolar beam pointing left and right, with little or no directional sensitivities towards other spatial angles that are not within the first bipolar beam.

In an embodiment, the first spatial filter is specified with weights, coefficients, parameters, and the like. These weights, coefficients, parameters, and the like, can be determined based on spatial positions, acoustic characteristics of the microphones (102-1, 102-2 and 102-3). The first spatial filter may, but is not required to, be specified or generated in real time or dynamically. Rather, the first spatial filter, or its weights, coefficients, parameters, and the like, can be determined beforehand, or before the mobile device (100) is operated by the user to generate the left-front and right-front audio signals.

In the operational scenarios as illustrated in FIG. 2A, as a part of generating the left-front and right-front audio signals, the mobile device (100) applies the first spatial filter (in real time or near real time) to the audio signals generated by the microphones (102-1, 102-2 and 102-3) to generate a first spatially filtered audio signal. The first spatially filtered audio signal represents a first beam formed audio signal, which may be an intermediate signal that may or may not be outputted. In an embodiment, the first spatially filtered audio signal is equivalent to an audio signal that would be generated by a directional microphone with the directional sensitivities of the first bipolar beam.

In an embodiment, the mobile device (100) uses the first spatially filtered audio signal generated from the audio signals of the microphones (102-1, 102-2 and 102-3) to remove a second audio signal portion from the modified front audio signal to generate a right audio signal. The second audio signal portion that is subtracted from the modified front audio signal represents a portion (e.g., 30% or more, 40% or more, 50% or more, 60% or more, 70% or more, 80% or more, 90% or more) of audio content both from the left and right sound sources, but only the signal from the left source is matched to the modified front signal so that after the subtraction the contribution from the left source is greatly reduced whereas the contribution from the right source is only colored. In an embodiment, the mobile device (100) may set the second audio signal portion to be a product of the first spatially filtered audio signal and a left-to-front transfer function.

In an embodiment, the left-to-front transfer function measures the difference or ratio between (1) audio signal responses of the front beam that covers the front hemisphere and that is used to generate the modified front audio signal, and (2) audio signal responses of the first bipolar beam that is used to generate the first spatially filtered audio signal, in response to sound emitted by a sound source located in the left side (e.g., the left side of the mobile device (100) of FIG. 2A in the present example) relative to the front direction (108-1) and the orientation of the mobile device (100). The left-to-front transfer function may be a device-specific function of frequencies, spatial directions, etc. The left-to-front transfer function may be determined in real time, in non-real time, in device design time, in device assembly time, in device calibration time before or after the device reaches or is released to an end user, etc.

In an embodiment, the left-to-front transfer function may be determined or generated beforehand, or before (e.g., actual, user-directed) left-front and right-front audio signals are made or generated by the mobile device (100). The left-to-front transfer function may be determined as a difference (in a logarithmic domain) or a ratio (in a linear domain or a non-logarithmic domain) between a test modified front audio signal generated by the front microphone (102-1) and the back microphone (102-2) (based on expression (1)) in response to a test left sound signal emitted by a test left sound source and a test first spatially filtered audio signal generated by applying the first spatial filter to test audio signals of the microphones (102-1, 102-2 and 102-3) in response to the same test left sound signal emitted by the test left sound source.

The test left sound signal (e.g., with different frequencies) may be played at one or more spatial locations from the left side of the mobile device (100). Audio signal responses from the microphones (102-1, 102-2 and 102-3) may be measured. The left-to-front transfer function (denoted as $H_{lf}(z)$) from the first bipolar beam to the front beam may be determined based on some or all of the audio signal responses as measured in response to the test left sound signal. For example, $H_{lf}(z)$ may be determined as: $H_{lf}(z)=S_f'(z)/b_1'(z)$, wherein $S_f'(z)$ is the z-transform of the test modified front audio signal and $b_1'(z)$ is the z-transform of the test first spatially filtered audio signal. Further, $S_f'(z)=m_1''(z)-H_{21}(z)*m_2''(z)$, wherein $m_1''(z)$ is the z-transform of the response of the front microphone to the test left sound signal and $m_2''(z)$ is the z-transform of the response of the back microphone to the test left sound signal.

In the operational scenarios as illustrated in FIG. 2A, the mobile device uses $H_{lf}(z)$, along with the first spatially filtered audio signal, to remove or reduce sounds from the left sound sources in the modified front audio signal, as follows:

$$R=S_f-b_1*H_{lf}(z) \tag{2}$$

where $b_1$ represents the first spatially filtered audio signal and R represents the right channel audio signal.

In an embodiment, the mobile device (100) applies a second spatial filter to audio signals generated by the microphones (102-1, 102-2 and 102-3). The second spatial filter causes audio signals of the microphones (102-1, 102-2 and 102-3) to form a beam of directional sensitivities focusing around the right spatial direction. By way of example but not limitation, the beam may be represented by a second bipolar beam pointing the left and right side (e.g., the right side of FIG. 2A), with little or no directional sensitivities towards other spatial angles that are not within the second bipolar beam.

In an embodiment, the second spatial filter is specified with weights, coefficients, parameters, and the like. These weights, coefficients, parameters, and the like, can be determined based on spatial positions, acoustic characteristics of the microphones (102-1, 102-2 and 102-3). The second spatial filter may, but is not required to, be specified or generated in real time or dynamically. Rather, the second spatial filter, or its weights, coefficients, parameters, and the like, can be determined beforehand, or before the mobile device (100) is operated by the user to generate the right-front and left-front audio signals.

In the operational scenarios as illustrated in FIG. 2A, as a part of generating the left-front and right-front audio signals, the mobile device (100) applies the second spatial filter (in real time or near real time) to the audio signals generated by the microphones (102-1, 102-2 and 102-3) to generate a second spatially filtered audio signal. The second spatially filtered audio signal represents a second beam formed audio signal, which may be an intermediate signal that may or may not be outputted. In an embodiment, the second spatially filtered audio signal is equivalent to an audio signal that would be generated by a directional microphone with the directional sensitivities of the second bipolar beam.

In an embodiment, the mobile device (100) uses the second spatially filtered audio signal generated from the audio signals of the microphones (102-1, 102-2 and 102-3) to remove a third audio signal portion from the modified front audio signal to generate a left audio signal. The third audio signal portion that is subtracted from the modified front audio signal represents a portion (e.g., 30% or more, 40% or more, 50% or more, 60% or more, 70% or more, 80% or more, 90% or more) of audio content from both the right and left sound sources, but only the signal from the right source is matched to the modified front signal so that after the subtraction the contribution from the right source is much reduced whereas the contribution from the left source is only colored. In an embodiment, the mobile device (100) may set the third audio signal portion to be a product of the second spatially filtered audio signal and a right-to-front transfer function.

In an embodiment, the right-to-front transfer function measures the difference or ratio between (1) audio signal responses of the front beam that covers the front hemisphere and that is used to generate the modified front audio signal, and (2) audio signal responses of the second bipolar beam that is used to generate the second spatially filtered audio signal, in response to sound emitted by a sound source located in the right side (e.g., the right side of the mobile device (100) of FIG. 2A in the present example) relative to the front direction (108-1) and the orientation of the mobile device (100). The right-to-front transfer function may be a device-specific function of frequencies, spatial directions, etc. The right-to-front transfer function may be determined in real time, in non-real time, in device design time, in device assembly time, in device calibration time before or after the device reaches or is released to an end user, etc.

In an embodiment, the right-to-front transfer function may be determined or generated beforehand, or before (e.g., actual, user-directed) left-front and right-front audio signals are made or generated by the mobile device (100). The right-to-front transfer function may be determined as a difference (in a logarithmic domain) or a ratio (in a linear domain or a non-logarithmic domain) between a test modified front audio signal generated by the front microphone (102-1) and the back microphone (102-2) (based on expression (1)) in response to a test right sound signal emitted by a test right sound source and a test second spatially filtered audio signal generated by applying the second spatial filter to test audio signals of the microphones (102-1, 102-2 and 102-3) in response to the same test right sound signal emitted by the test right sound source.

The test right sound signal (e.g., with different frequencies) may be played at one or more spatial locations from the left side of the mobile device (100). Audio signal responses from the microphones (102-1, 102-2 and 102-3) may be measured. The right-to-front transfer function (denoted as $H_{rf}(z)$) from the second bipolar beam to the front beam may be determined based on some or all of the audio signal responses as measured in response to the test right sound signal. For example, $H_{rf}(z)$ may be determined as: $H_{rf}(z) = S_f''(z)/b_2'(z)$, wherein $S_f''(z)$ is the z-transform of the test modified back audio signal and $b_2'(z)$ is the z-transform of the test second spatially filtered audio signal. Further, $S_f''(z)=m_1'''(z)-H_{21}(z)*m_2'''(z)$, wherein $m_1'''(z)$ is the z-transform of the response of the front microphone to the test right sound signal and $m_2'''(z)$ is the z-transform of the response of the back microphone to the test right sound signal. In the operational scenarios as illustrated in FIG. 2A, the mobile device uses $H_{rf}(z)$, along with the second spatially filtered audio signal, to remove or reduce sounds from the right sound sources in the modified front audio signal, as follows:

$$L=S_f-b_2*H_{rf}(z) \quad (3)$$

where $b_2$ represents the second spatially filtered audio signal and L represents the left channel audio signal.

In example operational scenarios as illustrated in FIG. 2B, in response to receiving a second request for audio recording (and possibly video recording at the same time), the mobile device (100) may enter a second operational mode for audio recording. The second request for audio recording may be generated based on second user input (e.g., selecting a specific recording function), for example, through a tactile user interface such as a touch screen interface (or the like) implemented on the mobile device (100). In an embodiment, the second operational mode corresponds to a selfie mode of the mobile device (100).

In an embodiment, in the second operational mode, the mobile device (100) uses the camera (112-2) at or near the second plate (104-2) to acquire images for video recording and the microphones (102-1, 102-2 and 102-3) to acquire audio signals for concurrent audio recording.

Based on the second operational mode in which the camera (112-2) is used to capture imagery information, the audio generator (300) of the mobile device (100) establishes, or otherwise determines, that the bottom direction of FIG. 2B, from among the plurality of spatial directions of the mobile device (100), to represent a second front direction (108-2) for the second operational mode. Additionally, optionally, or alternatively, the mobile device (100) may receive user input that specifies the bottom direction of FIG. 2A, from among the plurality of spatial directions of the mobile device (100), as the second front direction (108-2) for the second operational mode.

In an embodiment, based at least in part on the second front direction (108-2), the mobile device (100) may select the microphone (102-2) as a second front microphone. The audio signal as generated by the selected second front microphone (102-2) may be designated or used as a second front audio signal.

In an embodiment, based at least in part on the microphone (102-2) being selected as the second front microphone, the mobile device (100) may select the microphone (102-1) as a second back microphone. The audio signal as generated by the selected second back microphone (102-1) may be designated or used as a second back audio signal.

In an embodiment, the mobile device (100) uses the second back audio signal generated by the second back microphone (102-1) to remove a fourth audio signal portion from the second front audio signal to generate a second modified front audio signal. In an embodiment, the mobile device (100) may set the fourth audio signal portion to be a product of the second back audio signal and a second back-to-front transfer function.

The second back-to-front transfer function (denoted as $H_{12}(z)$) from the microphone (102-1) to the microphone (102-2) may be determined based on some or all of the audio signal responses as measured in response to a test sound signal in the back side (above the first plate (104-1) of FIG. 2B in the present example. In the operational as illustrated in FIG. 2B, the mobile device uses $H_{12}(z)$, along with the second back audio signal generated by the second back microphone (102-1), to cancel or remove sounds from back sound sources in the second front audio signal generated by the second front microphone (102-2), as follows:

$$S_f'=m_2-m_1*H_{12}(z) \quad (4)$$

where $m_2$ represents the second front microphone signal (or the second front audio signal generated by the microphone (102-2)), $m_1$ represents the second back microphone signal (or the second back audio signal generated by the microphone (102-1)), and $S_f'$ represents the second modified front microphone signal.

In an embodiment, the second modified front audio signal represents a second front beam that covers a hemisphere below the second plate (104-2) of FIG. 2B. Subsequently, a second left sound cancelling process may be applied to cancel sounds from the left side in the second front beam represented by the second modified front audio signal to get a third beam with a right-front focus in the second operational mode; the third beam with the right-front focus in the second operational mode can then be designated as a second right channel audio signal of a second output audio signal. Similarly, a second right sound cancelling process may be applied to cancel sounds from the right side in the second front beam represented by the second modified front audio signal to get a fourth beam with a left-front focus; the fourth beam with the left-front focus can then be designated as a second left channel audio signal of the second output audio signal. It should be noted that in various embodiments, some or all of sound cancelling processes as described herein can be performed concurrently, serially, partly concurrently, or partly serially. Additionally, optionally, or alternatively, some or all of sound cancelling processes as described herein can be performed in any of one or more different orders.

In an embodiment, for the purpose of applying the second left and right sound cancelling processes as mentioned above, the mobile device (100) determines each of left and right spatial directions, for example, in reference to the orientation of the mobile device (100) and the second front direction (108-2).

In an embodiment, the mobile device (100) applies a third spatial filter to audio signals generated by the microphones (102-1, 102-2 and 102-3). The third spatial filter causes the microphones (102-1, 102-2 and 102-3) to form a beam of directional sensitivities focusing around the right spatial direction (or the left side of FIG. 2B in the selfie mode). In an embodiment, the third spatial filter used in the operational scenarios of FIG. 2B is the same as the first spatial filter used in the operational scenarios of FIG. 2A.

In the operational scenarios as illustrated in FIG. 2B, as a part of generating the second left audio signal and second right audio signal, the mobile device (100) applies the third spatial filter (in real time or near real time) to the audio signals generated by the microphones (102-1, 102-2 and 102-3) to generate a third spatially filtered audio signal. The third spatially filtered audio signal represents a third beam formed audio signal, which may be an intermediate signal that may or may not be outputted. In an embodiment, the third spatially filtered audio signal is equivalent to an audio signal that would be generated by a directional microphone with the directional sensitivities of the first bipolar beam.

In an embodiment, the mobile device (100) uses the third spatially filtered audio signal generated from the audio signals of the microphones (102-1, 102-2 and 102-3) to remove a fifth audio signal portion from the second modified front audio signal to generate a left (channel) audio signal in the second operational mode (e.g., the selfie mode). In an embodiment, the mobile device (100) may set the fifth audio signal portion to be a product of the third spatially filtered audio signal and a second right-to-front transfer function.

In an embodiment, the second right-to-front transfer function measures the difference or ratio between (1) audio signal responses of the second front beam that covers the hemisphere below the second plate (104-2) of FIG. 2B and that is used to generate the second modified front audio signal, and (2) audio signal responses of the first bipolar beam that is used to generate the third spatially filtered audio signal, in response to sound emitted by a sound source located in the right side (e.g., the left side of the mobile device (100) of FIG. 2B in the present example) relative to the second front direction (108-2) and the orientation of the mobile device (100). The second right-to-front transfer function may be a device-specific function of frequencies, spatial directions, etc. The second right-to-front transfer function may be determined in real time, in non-real time, in device design time, in device assembly time, in device calibration time before or after the device reaches or is released to an end user, etc.

In an embodiment, the second right-to-front transfer function may be determined or generated beforehand, or before (e.g., actual, user-directed) left-front and right-front audio signals are made or generated by the mobile device (100). The second right-to-front transfer function may be determined as a difference (in a logarithmic domain) or a ratio (in a linear domain or a non-logarithmic domain) between a second test modified front audio signal generated by the second front microphone (102-1) and the second back microphone (102-2) (based on expression (4)) in response to a second test right sound signal emitted by a second test right sound source and a test third spatially filtered audio signal generated by applying the third spatial filter to second test audio signals of the microphones (102-1, 102-2 and 102-3) in response to the same second test right sound signal emitted by the test right sound source.

The second test right sound signal (e.g., with different frequencies) may be played at one or more spatial locations from the right side (or the left side of FIG. 2B in the selfie mode) of the mobile device (100) in the second operational mode. Audio signal responses from the microphones (102-1, 102-2 and 102-3) may be measured. The second right-to-front transfer function (denoted as $H'_{rf}(z)$) from the first bipolar beam to the second front beam may be determined based on some or all of the audio signal responses as measured in response to the second test right sound signal. In the operational scenarios as illustrated in FIG. 2B, the mobile device uses $H'_{rf}(z)$, along with the third spatially filtered audio signal, to remove or reduce sounds from the right sound sources in the second modified front audio signal, as follows:

$$L'=S_f'-b_3*H'_{rf}(z) \tag{5}$$

where $b_3$ represents the third spatially filtered audio signal and L' represents the second left channel audio signal.

In an embodiment, the mobile device (100) applies a fourth spatial filter to audio signals generated by the microphones (102-1, 102-2 and 102-3). The fourth spatial filter causes audio signals of the microphones (102-1, 102-2 and 102-3) to form a beam of directional sensitivities focusing around the left spatial direction (or the right side of FIG. 2B in the selfie mode). The fourth spatially filtered audio signal represents a fourth beam formed audio signal, which may be an intermediate signal that may or may not be outputted. In an embodiment, the fourth spatially filtered audio signal is equivalent to an audio signal that would be generated by a directional microphone with the directional sensitivities of the second bipolar beam.

In an embodiment, the mobile device (100) uses the fourth spatially filtered audio signal generated from the audio signals of the microphones (102-1, 102-2 and 102-3) to remove a sixth audio signal portion from the second modified front audio signal to generate a second right (channel) audio signal in the second operational mode (e.g., the selfie mode). In an embodiment, the mobile device (100) may set the sixth audio signal portion to be a product of the fourth spatially filtered audio signal and a second left-to-front transfer function.

In an embodiment, the second left-to-front transfer function measures the difference or ratio between (1) audio signal responses of the second front beam that covers the hemisphere below the second plate (104-2) of FIG. 2B and that is used to generate the second modified front audio signal, and (2) audio signal responses of the second bipolar beam that is used to generate the fourth spatially filtered audio signal, in response to sound emitted by a sound source located in the left side (e.g., the right side of the mobile device (100) of FIG. 2B in the present example) relative to the second front direction (108-2) and the orientation of the mobile device (100). The second left-to-front transfer function may be a device-specific function of frequencies, spatial directions, etc. The second left-to-front transfer function may be determined in real time, in non-real time, in device design time, in device assembly time, in device calibration time before or after the device reaches or is released to an end user, etc.

In an embodiment, the second left-to-front transfer function may be determined or generated beforehand, or before (e.g., actual, user-directed) audio signals are made or generated by the mobile device (100). The second left-to-front transfer function may be determined as a difference (in a logarithmic domain) or a ratio (in a linear domain or a non-logarithmic domain) between a second test modified front audio signal generated by the second front microphone (102-1) and the second back microphone (102-2) (based on expression (4)) in response to a second test left sound signal emitted by a second test left sound source and a test fourth spatially filtered audio signal generated by applying the fourth spatial filter to second test audio signals of the microphones (102-1, 102-2 and 102-3) in response to the same second test left sound signal emitted by the test left sound source.

The second test left sound signal (e.g., with different frequencies) may be played at one or more spatial locations from the left side (or the right side of FIG. 2B in the selfie mode) of the mobile device (100) in the second operational mode. Audio signal responses from the microphones (102-1, 102-2 and 102-3) may be measured. The second left-to-front transfer function (denoted as $H'_{lf}(z)$) from the second bipolar beam to the second front beam may be determined based on some or all of the audio signal responses as measured in response to the second test left sound signal. In the operational scenarios as illustrated in FIG. 2B, the mobile device uses $H'_{lf}(z)$, along with the fourth spatially filtered audio signal, to remove or reduce sounds from the left sound sources in the second modified front audio signal, as follows:

$$R'=S_f'-b_4*H'_{lf}(z) \tag{5}$$

where $b_4$ represents the fourth spatially filtered audio signal and R' represents the second right channel audio signal.

In an embodiment, in response to receiving a third request for surround audio recording (and possibly video recording at the same time), the mobile device (100) may enter a third operational mode for surround audio recording. The third request for surround audio recording may be generated based on third user input (e.g., selecting a specific recording function), for example, through a tactile user interface such as a touch screen interface (or the like) implemented on the mobile device (100).

In an embodiment, in the third operational mode, the mobile device (100) uses the camera (112-1) at or near the first plate (104-1) to acquire images for video recording and the microphones (102-1, 102-2 and 102-3) to acquire audio signals for concurrent audio recording.

Based on the third operational mode in which the camera (112-1) is used to capture imagery information, the audio generator (300) of the mobile device (100) establishes, or otherwise determines, that the top direction of FIG. 2A, from among the plurality of spatial directions of the mobile device (100), to represent a third front direction (108-1) for the third operational mode. Additionally, optionally, or alternatively, the mobile device (100) may receive user input that specifies the top direction of FIG. 2A, from among the plurality of spatial directions of the mobile device (100), as the third front direction (108-1) for the third operational mode In an embodiment, in the third operational mode, the mobile device (100) constructs a right channel of a surround audio signal in the same manner as how the right channel audio signal R is constructed, as represented in expression (2); constructs a left channel of the surround audio signal in the same manner as how the left channel audio signal L is constructed, as represented in expression (3); constructs a left surround (Ls) channel of the surround audio signal in the same manner as how the second right channel audio signal R' is constructed, as represented in expression (6); constructs a right surround (Rs) channel of the surround audio signal in the same manner as how the second left channel audio signal L' is constructed, as represented in expression (5).

In various embodiments, these audio signals of the surround audio signal can be constructed in parallel, in series, partly in parallel, or partly in series. Additionally, optionally, or alternatively, these audio signals of the surround audio signal can be any of one or more different orders.

In an embodiment, in response to receiving a fourth request for surround audio recording (and possibly video recording at the same time), the mobile device (100) may enter a fourth operational mode for surround audio recording. The fourth request for surround audio recording may be generated based on fourth user input (e.g., selecting a specific recording function), for example, through a tactile user interface such as a touch screen interface (or the like) implemented on the mobile device (100).

In an embodiment, in the fourth operational mode, the mobile device (100) uses the camera (112-2) at or near the second plate (104-2) to acquire images for video recording and the microphones (102-1, 102-2 and 102-3) to acquire audio signals for concurrent audio recording.

Based on the fourth operational mode in which the camera (112-2) is used to capture imagery information, the audio generator (300) of the mobile device (100) establishes, or otherwise determines, that the bottom direction of FIG. 2B, from among the plurality of spatial directions of the mobile device (100), to represent a fourth front direction (108-2) for the fourth operational mode. Additionally, optionally, or alternatively, the mobile device (100) may receive user input that specifies the top direction of FIG. 2A, from among the plurality of spatial directions of the mobile device (100), as the fourth front direction (108-1) for the fourth operational mode In an embodiment, in the fourth operational mode, the mobile device (100) constructs a right front channel of a surround audio signal in the same manner as how the second right channel audio signal R' is constructed, as represented in expression (6); constructs a left front channel of the surround audio signal in the same manner as how the second left channel audio signal L' is constructed, as represented in expression (5); constructs a left surround channel of the surround audio signal in the same manner as how the right channel audio signal R is constructed, as represented in expression (2); constructs a right surround channel of the surround audio signal in the same manner as how the left channel audio signal L of the audio signal is constructed, as represented in expression (3).

In various embodiments, these audio signals of the surround audio signal can be constructed in parallel, in series, partly in parallel, or partly in series. Additionally, optionally, or alternatively, these audio signals of the surround audio signal can be any of one or more different orders.

It has been described that an audio signal or a modified audio signal here can be processed through linear relationships such as represented by expressions (1) through (6). This is for illustration purposes only. In various embodiments, an audio signal or a modified audio signal here can also be processed through linear relationships other than represented by expressions (1) through (6), or through non-linear relationships. For example, in some embodiments, one or more non-linear relationships may be used to remove sound from the back side, from the left right, or from the right side, or a different direction other than the foregoing.

It has been described that a modified front audio signal can be created with a front microphone and a back microphone based on a front beam that covers a front hemisphere. This is for illustration purposes only. In various embodiments, a modified front audio signal can be created with a front microphone and a back microphone based on a front beam (formed by spatially filtering audio signals of multiple microphones of the mobile device) that covers more or less than a front hemisphere. Additionally, optionally, or alternatively, an audio signal constructed from applying spatial filtering (e.g., with a spatial filter, with a transfer function, etc.) to audio signals of two or more microphones of a mobile device may be generated based on a beam with any of a wide variety of spatial directionalities and beam patterns. In an embodiment, a front audio signal as described herein may be generated by spatially filtering audio signals acquired by two or more microphones based on a front beam pattern, rather than generated by a single front microphone. In an embodiment, a modified front audio signal as described herein may be generated by cancelling sounds captured in a back audio signal generated by spatially filtering audio signals acquired by two or more microphones based on a back beam pattern, rather than generated by cancelling sounds captured in a back audio signal generated by a single back microphone.

Figure 2C:
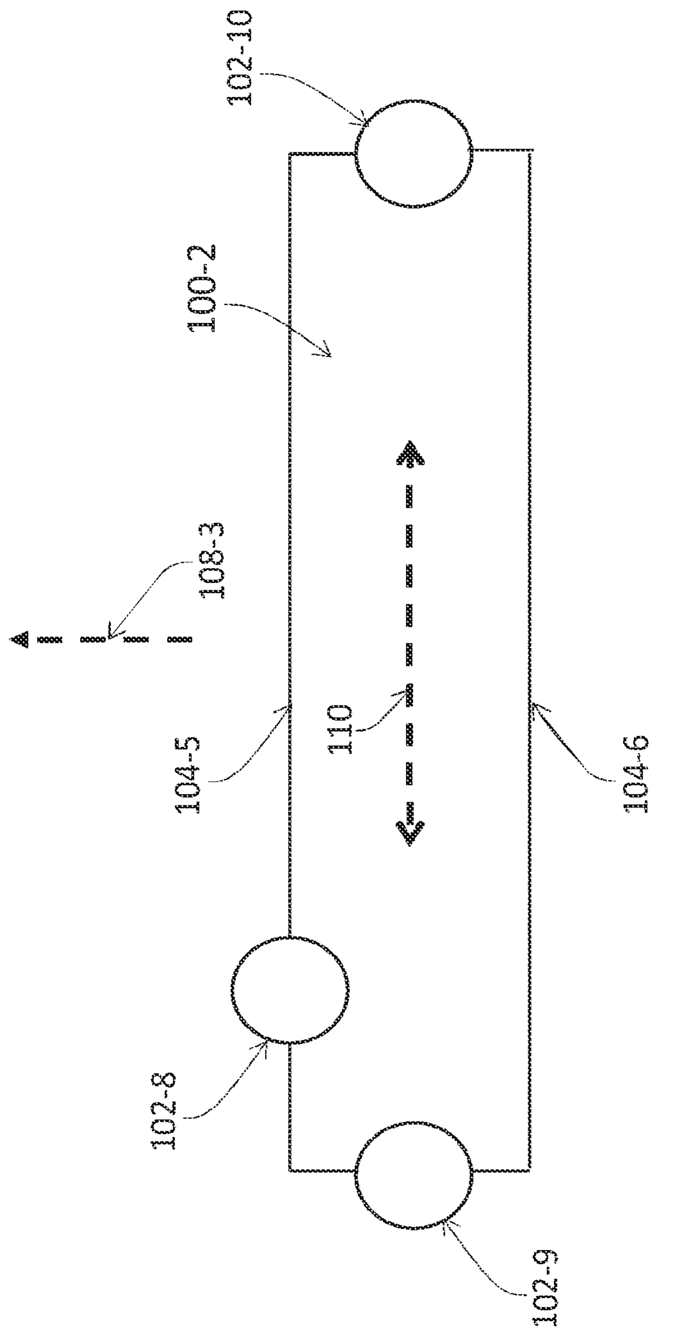
Figure 2D:
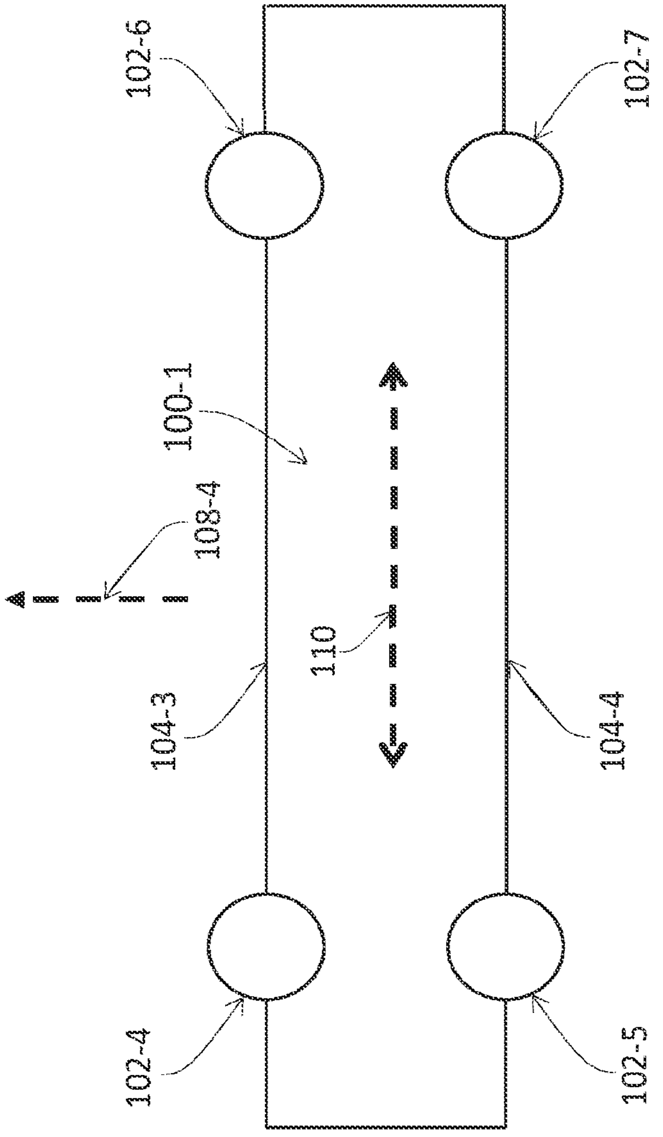

In an embodiment, in example operational scenarios as illustrated in FIG. 2C, a mobile device (e.g., 100-2 of FIG. 1C) may have a microphone configuration that is different from that in the example operational scenarios as illustrated in FIG. 2A. For example, in the microphone configuration of the mobile device (100-2), there is no microphone on the back plate (or the sixth plate 104-6). In an embodiment, the mobile device (100-2) uses audio signals acquired by two side microphones (102-9 and 102-10) to generate a back audio signal, rather than using a back microphone (102-2) as illustrated in FIG. 2A. The back audio signal can be generated at least in part by using a spatial filter (corresponding to a beam with a back focus) to filter the audio signals acquired by the side microphones (102-9 and 102-10). A back-to-front transfer function can be determined to represent the difference, or ratio between a front audio signal (e.g., generated by the microphone (102-8)) and the back audio signal using test front audio signal and test back audio signals in response to back sound signals beforehand, or before audio processing is performed by the mobile device (100-2). A product of the back-to-front transfer function and the back audio signal formed by the audio signals of the side microphones (102-9 and 102-10) can be used to cancel or reduce back sounds in the front audio signal to generate a modified front audio signal as described herein. As the front/back sound level difference caused by the body or device shadowing is smaller (e.g., 6 dB versus 10 dB) in the mobile device (100-2) than in the mobile device (100), back sound cancelling may be less effective in the mobile device (100-2) than in the mobile device (100).

It has been described that a modified front audio signal can be created by cancelling back sounds from a back hemisphere. This is for illustration purposes only. In various embodiments, an audio signal used to cancel sounds in another audio signal from certain spatial directions can be based on a beam with any of a wide variety of spatial directionalities and beam patterns. In an example, an audio signal can be created with a very narrow beam width (e.g., a few angular degrees, a few tens of angular degrees, and the like) toward a certain spatial direction; the audio signal with the very narrow beam width may be used to cancel sounds in another audio signal based on a transfer function determined based on audio signal measurements of a test sound signal from the certain spatial direction. As a result, a modified audio signal with sounds heavily suppressed in the certain spatial direction (e.g., a notch direction) while all other sounds are passed through may be generated. The certain spatial direction or the notch direction can be any of a wide variety of spatial directions. For example, in a specific operational mode, a modified audio signal generated by a back notch (in the bottom direction of FIG. 2A or FIG. 2B) can be generated to heavily suppress the mobile device's operator's sound. Similarly, in any of one or more operational modes, a modified audio signal generated by any of one or more notch directions (e.g., in one of top, left, bottom, and right direction of FIG. 2A or FIG. 2B) can be generated to heavily suppress sounds in that notch direction.

It has been described that video processing and/or video recording may be concurrently made with audio recording and/or audio processing (e.g., binaural audio processing, surround audio processing, and the like). This is for illustration purposes only. In various embodiments, audio recording and/or audio processing as described herein can be performed without performing video processing and/or without performing video recording. For example, a binaural audio signal, a surround audio signal, and the like, can be generated by a mobile device as described herein in audio-only operational modes.

5. EXAMPLE BEAM FORMING

Because of device shadowing effects, multiple microphones of a mobile device as described herein are typically in a non-free field setup. The mobile device can construct a bipolar beam based on spatially filtering audio signals of selected microphones in its particular microphone configuration.

In an embodiment, the mobile device (e.g., 100-2 of FIG. 1C) has a left microphone (e.g., 102-9 of FIG. 1C) and a right microphone (e.g., 102-10 of FIG. 1C), for example along a transverse direction (e.g., 110 of FIG. 2C) of the mobile device. By way of example but not limitation, the mobile device can use audio signals acquired by the left and right microphones to form a bipolar beam towards a left and right directions (e.g., the left side of FIG. 2C).

In an embodiment, the mobile device (e.g., 100 of FIG. 1A) has a right microphone (e.g., 102-3 of FIG. 1A), but has no microphone that faces a left direction, for example along a transverse direction (e.g., 110 of FIG. 2A) of the mobile device. By way of example but not limitation, the mobile device can use an audio signal acquired by an upward facing microphone (102-1) and an audio signal acquired by a downward facing microphone (102-2), both of which are on the left side of the mobile device, to form a left audio signal.

In an embodiment, the left audio signal may be omnidirectional. The mobile device can further use this left audio signal (formed by both audio signals of the microphones 102-1 and 102-2) and an audio signal acquired by the right microphone (102-3) to form a bipolar beam towards a left and right directions (e.g., the left side of FIG. 2A). In an embodiment, to form a bipolar beam towards the left direction, the mobile device may determine a right-to-left transfer function and use a product of the right-to-left transfer function and the audio signal acquired by the right microphone to cancel right sounds from the left audio signal to form the bipolar beam towards the left direction. Additionally, optionally, or alternatively, an equalizer can be used to compensate for distortions, coloring, and the like.

In an embodiment, the mobile device (e.g., 100-1 of FIG. 1B) has no microphone that faces a left direction and has no microphone that faces a right direction. By way of example but not limitation, the mobile device can use an audio signal acquired by an upward facing microphone (102-4) and an audio signal acquired by a downward facing microphone (102-5), both of which are on the left side of the mobile device, to form a left audio signal; and use an audio signal acquired by a second upward facing microphone (102-6) and an audio signal acquired by a second downward facing microphone (102-7), both of which are on the right side of the mobile device, to form a right audio signal. In an embodiment, one or both of the left and right audio signals may be omnidirectional. The mobile device can further use the left audio signal (formed by both audio signals of the microphones 102-4 and 102-5) and the right audio signal (formed by both audio signals of the microphones 102-6 and 102-7) to form a bipolar beam towards a left and right directions (e.g., the left side of FIG. 2D). Additionally, optionally, or alternatively, an equalizer can be used to compensate for distortions, coloring, and the like.

In various embodiments, bipolar beams of these and other directionalities including but not limited to top, left, bottom and right directionalities can be formed by multiple microphones of a mobile device as described herein.

6. AUDIO GENERATOR

Figure 3:
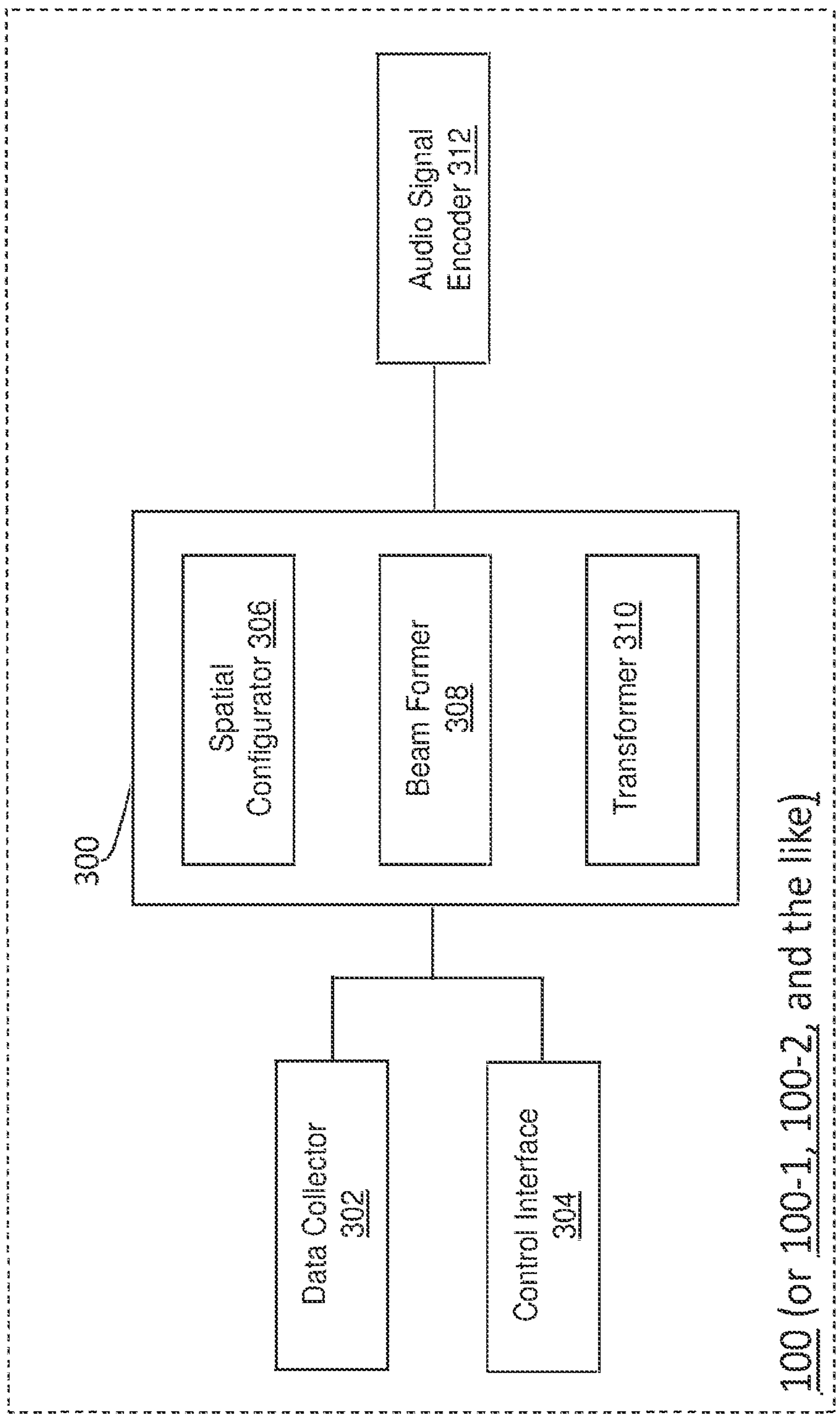
FIG. 3 illustrates an example audio generator in accordance with example embodiments described herein.

FIG. 3 is a block diagram illustrating an example audio generator 300 of a mobile device (e.g., 100 of FIG. 1A, 100-1 of FIG. 1B, 100-2 of FIG. 1C, and the like), in accordance with one or more embodiments. In FIG. 3, the audio generator (300) is represented as one or more processing entities collectively configured to receive audio signals, video signals, sensor data, and the like, from a data collector 302. In an embodiment, some or all of the audio signals are generated by microphones 102-1, 102-2 and 102-3 of FIG. 1A; 102-4, 102-5, 102-6 and 102-7 of FIG. 1B; 102-8, 102-9 and 102-10 of FIG. 1C; and the like. In an embodiment, some or all of the video signals are generated by cameras 112-1 and 112-2 of FIG. 2A or FIG. 2B, and the like. In an embodiment, some or all of the sensor data is generated by orientation sensors, accelerometer, geomagnetic field sensor (not shown), and the like.

Additionally, optionally, or alternatively, the audio generator (300), or the processing entities therein, can receive control input from a control interface 304. In an embodiment, some or all of the control input is generated by user input, remote controls, keyboards, touch-based user interfaces, pen-based interfaces, graphic user interface displays, pointer devices, other processing entities in the mobile device or in another computing device, and the like.

In an embodiment, the audio generator (300) includes processing entities such as a spatial configurator 306, a beam former 308, a transformer 310, and the like. In an embodiment, the spatial configurator (306) includes software, hardware, or a combination of software and hardware, configured to receive sensor data such as positional, orientation sensor data, and the like, from the data collector (302), control input such as operational modes, user input, and the like, from the control interface (304), or the like. Based on some or all of the data received, the spatial configurator (306) establishes, or otherwise determines, an orientation of the mobile device, a front direction (e.g., 108-1 of FIG. 2A, 108-2 of FIG. 2B, 108-3 of FIG. 2C, 108-4 of FIG. 2D, and the like), a back direction, a left direction, a right direction, and the like. Some of these directions may be specified relative to one or both of the front direction and the orientation of the mobile device.

In an embodiment, the beam former (308) includes software, hardware, or a combination of software and hardware, configured to receive audio signals generated from the microphones from the data collector (302), control input such as operational modes, user input, and the like, from the control interface (304), or the like. Based on some or all of the data received, the beam former (308) selects one or more spatial filters (which may be predefined, pre-calibrated, or pre-generated), applies the one or more spatial filters to some or all of the audio signals acquired by the microphones to form one or more spatially filtered audio signals as described herein.

In an embodiment, the transformer (310) includes software, hardware, or a combination of software and hardware, configured to receive audio signals generated from the microphones from the data collector (302), control input such as operational modes, user input, and the like, from the control interface (304), spatially filtered audio signals from the beam former (308), directionality information from the spatial configurator (306), or the like. Based on some or all of the data received, the transformer (310) selects one or more transfer functions (which may be predefined, pre-calibrated, or pre-generated), applies audio signal transformations based on the selected transfer functions to some or all of the audio signals acquired by the microphones and the spatially filtered audio signals to form one or more binaural audio signals, one or more surround audio signals, one or more audio signals that heavily suppress sounds on one or more specific spatial directions, or the like.

In an embodiment, the audio signal encoder (312) includes software, hardware, or a combination of software and hardware, configured to receive audio signals generated from the microphones from the data collector (302), control input such as operational modes, user input, and the like, from the control interface (304), spatially filtered audio signals from the beam former (308), directionality information from the spatial configurator (306), binaural audio signals, surround audio signals or audio signals that heavily suppress sounds on one or more specific spatial directions from the transformer (310), or the like. Based on some or all of the data received, the audio signal encoder (312) generates one or more output audio signals. These output audio signals can be recorded in one or more tangible recording media, can be delivered/transmitted directly or indirectly to one or more recipient media devices, or can be used to drive audio rendering devices.

Some or all of techniques as described herein can be applied to audio signals in a time domain, or in a transform domain. Additionally, optionally, or alternatively, some or all of these techniques can be applied to audio signals in full bandwidth representations (e.g., a full frequency range supported by an input audio signal as described herein) or in subband representations (e.g., subdivisions of a full frequency range supported by an input audio signal as described herein).

In an embodiment, an analysis filterbank is used to decompose each of one or more input audio signals into one or more pluralities of input subband audio data portions (e.g., in a frequency domain). Each of the one or more pluralities of input subband audio data portions correspond to a plurality of subbands (e.g., in the frequency domain). Audio processing techniques as described here can then be applied to the input subband audio data portions in individual subbands. In an embodiment, a synthesis filterbank is used to reconstruct processed subband audio data portions as processed under techniques as described herein into one or more output audio signals (e.g., binaural audio signals, surround audio signals).

7. EXAMPLE PROCESS FLOW

Figure 4:
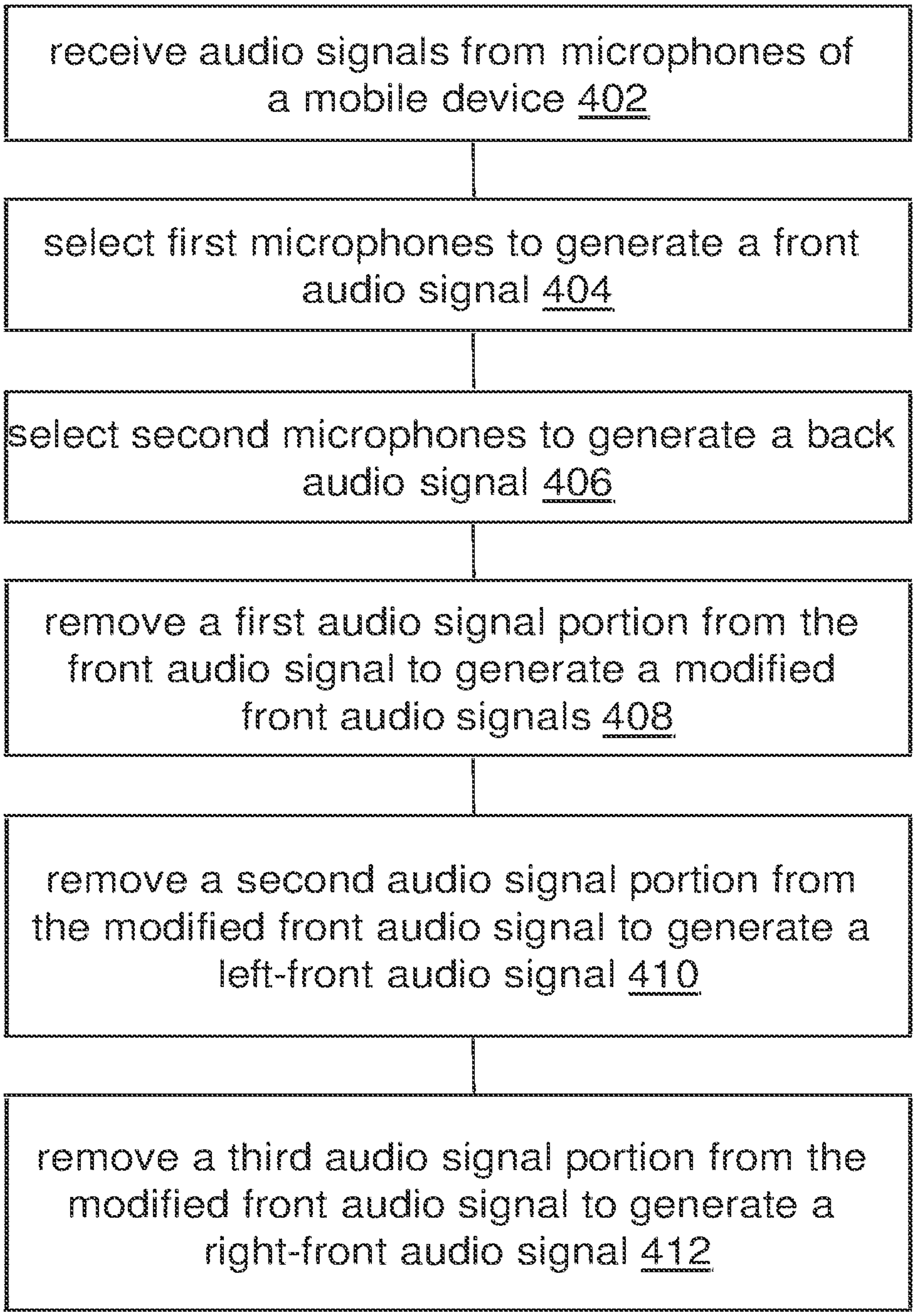
FIG. 4 illustrates an example process flow in accordance with example embodiments described herein.

FIG. 4 illustrates an example process flow suitable for describing the example embodiments described herein. In some embodiments, one or more computing devices or units (e.g., a mobile device as described herein, an audio generator of a mobile device as described herein, etc.) may perform the process flow.

In block 402, a mobile device receives a plurality of audio signals from a plurality of microphones of a mobile device, each audio signal in the plurality of audio signals being generated by a respective microphone in the plurality of microphones.

In block 404, the mobile device selects one or more first microphones from among the plurality of microphones to generate a front audio signal.

In block 406, the mobile device selects one or more second microphones from among the plurality of microphones to generate a back audio signal.

In block 408, the mobile device removes a first audio signal portion from the front audio signal to generate a modified front audio signal, the first audio signal portion being determined based at least in part on the back audio signal.

In block 410, the mobile device uses a first spatially filtered audio signal formed by two or more audio signals of two or more third microphones in the plurality of audio signals to remove a second audio signal portion from the modified front audio signal to generate a left-front audio signal.

In block 412, the mobile device uses a second spatially filtered audio signal formed by two or more audio signals of two or more fourth microphones in the plurality of audio signals to remove a third audio signal portion from the modified front audio signal to generate a right-front audio signal.

In an embodiment, each of one or more of the front audio signal, the back audio signal, the second audio signal portion, or the third audio signal portion, is derived from a single audio signal acquired by a single microphone in the plurality of microphones.

In an embodiment, each microphone in the plurality of microphones is an omnidirectional microphone.

In an embodiment, at least one microphone in the plurality of microphones is a directional microphone.

In an embodiment, the first audio signal portion captures sounds emitted by sound sources located on a back side; the second audio signal portion captures sounds emitted by sound sources located on a right side; the third audio signal portion captures sounds emitted by sound sources located on a left side. In an embodiment, at least one of the back side, the right side, or the left side is determined based on one or more of user input, a front direction in an operational mode of the mobile device, or an orientation of the mobile device.

In an embodiment, the one or more first microphones are selected from among the plurality of microphones based on a front direction as determined in an operational mode of the mobile device. In an embodiment, the operational mode of the mobile device is one of a regular operational mode, a selfie mode, an operational mode related to binaural audio processing, an operational mode related to surround audio processing, or an operational mode related to suppressing sounds in one or more specific spatial directions.

In an embodiment, the left-front audio signal is used to represent one of a left front audio signal of a surround audio signal or a right surround audio signal of a surround audio signal; the right-front audio signal is used to represent one of a right front audio signal of a surround audio signal or a left surround audio signal of a surround audio signal.

In an embodiment, the first spatially filtered audio signal represents a first beam formed audio signal generated based on a first bipolar beam; the second spatially filtered audio signal represents a second beam formed audio signal generated based on a second bipolar beam.

In an embodiment, the first bipolar beam is oriented towards right, whereas the second bipolar beam is oriented towards left.

In an embodiment, the first spatially filtered audio signal is generated by applying a first spatial filter to the two or more microphone signals of the two or more third microphones. In an embodiment, the first spatial filter has high sensitivities (e.g., maximum gains, directionalities) to sounds from one or more right directions. In an embodiment, the first spatial filter has low sensitivities (e.g., high attenuations, low side lobes) to sounds from directions other than one or more right directions. In an embodiment, the first spatial filter is predefined before audio processing is performed by the mobile device.

In an embodiment, each of one or more of the front audio signal, the back audio signal, the second audio signal portion, or the third audio signal portion, is derived as a product of a specific audio signal and a specific transfer function.

In an embodiment, the specific transfer function is predefined before audio processing is performed by the mobile device.

Embodiments include, a media processing system configured to perform any one of the methods as described herein.

Embodiments include an apparatus including a processor and configured to perform any one of the foregoing methods.

Embodiments include a non-transitory computer readable storage medium, storing software instructions, which when executed by one or more processors cause performance of any one of the foregoing methods. Note that, although separate embodiments are discussed herein, any combination of embodiments and/or partial embodiments discussed herein may be combined to form further embodiments.

8. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
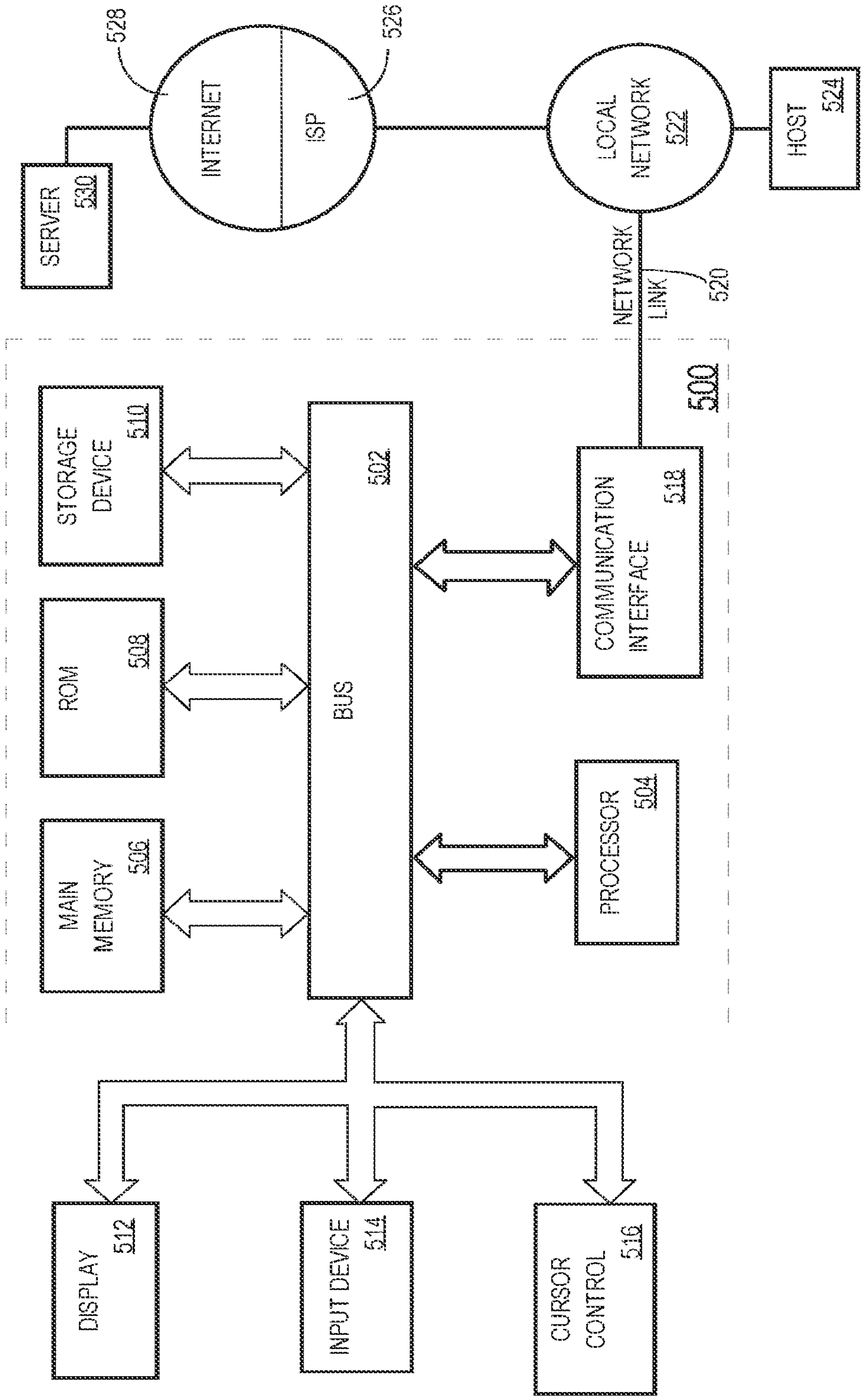
FIG. 5 illustrates an example hardware platform on which a computer or a computing device as described herein may be implement the example embodiments described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that include bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

9. EQUIVALENTS, EXTENSIONS, ALTERNATIVES AND MISCELLANEOUS

In the foregoing specification, example embodiments have been described with reference to numerous specific details that may vary from implementation to implementation. Any definitions expressly set forth herein for terms contained in the claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various modifications and adaptations to the foregoing example embodiments may become apparent to those skilled in the relevant arts in view of the foregoing description, when it is read in conjunction with the accompanying drawings. Any and all modifications will still fall within the scope of the non-limiting and example embodiments. Furthermore, other example embodiment category forth herein will come to mind to one skilled in the art to which these embodiments pertain having the benefit of the teachings presented in the foregoing descriptions and the drawings.

Accordingly, the present invention may be embodied in any of the forms described herein. For example, the following enumerated example embodiments (EEEs) describe some structures, features, and functionalities of some aspects of the present invention.

EEE 1. A computer-implemented method, comprising: receiving a plurality of audio signals from a plurality of microphones of a mobile device, each audio signal in the plurality of audio signals being generated by a respective microphone in the plurality of microphones; selecting one or more first microphones from among the plurality of microphones to generate a front audio signal; selecting one or more second microphones from among the plurality of microphones to generate a back audio signal; removing a first audio signal portion from the front audio signal to generate a modified front audio signal, the first audio signal portion being determined based at least in part on the back audio signal; using a first spatially filtered audio signal formed by two or more audio signals of two or more third microphones in the plurality of audio signals to remove a second audio signal portion from the modified front audio signal to generate a left-front audio signal of a binaural audio signal; using a second spatially filtered audio signal formed by two or more audio signals of two or more fourth microphones in the plurality of audio signals to remove a third audio signal portion from the modified front audio signal to generate a right-front audio signal of the binaural audio signal.

EEE 2. The method as recited in EEE 1, wherein each of one or more of the front audio signal, the back audio signal, the second audio signal portion, or the third audio signal portion, is derived from a single audio signal acquired by a single microphone in the plurality of microphones.

EEE 3. The method as recited in EEE 1, wherein each microphone in the plurality of microphones is an omnidirectional microphone.

EEE 4. The method as recited in EEE 1, wherein at least one microphone in the plurality of microphones is a directional microphone.

EEE 5. The method as recited in EEE 1, wherein the first audio signal portion captures sounds emitted by sound sources located on a back side; wherein the second audio signal portion captures sounds emitted by sound sources located on a right side; and wherein the third audio signal portion captures sounds emitted by sound sources located on a left side.

EEE 6. The method as recited in EEE 5, wherein at least one of the back side, the right side, or the left side is determined based on one or more of user input, a front direction in an operational mode of the mobile device, or an orientation of the mobile device.

EEE 7. The method as recited in EEE 1, wherein the one or more first microphones are selected from among the plurality of microphones based on a front direction as determined in an operational mode of the mobile device.

EEE 8. The method as recited in EEE 7, wherein the operational mode of the mobile device is one of a regular operational mode, a selfie mode, an operational mode related to binaural audio processing, an operational mode related to surround audio processing, or an operational mode related to suppressing sounds in one or more specific spatial directions.

EEE 9. The method as recited in EEE 1, wherein the left-front audio signal of the binaural audio signal is used to represent one of a left front audio signal of a surround audio signal or a right surround audio signal of a surround audio signal, and wherein the right-front audio signal of the binaural audio signal is used to represent one of a right front audio signal of a surround audio signal or a left surround audio signal of a surround audio signal.

EEE 10. The method as recited in EEE 1, wherein the first spatially filtered audio signal represents a first beam formed audio signal generated based on a first bipolar beam, and wherein the second spatially filtered audio signal represents a second beam formed audio signal generated based on a second bipolar beam.

EEE 11. The method as recited in EEE 10, wherein the first bipolar beam is oriented towards right, whereas the second bipolar beam is oriented towards left.

EEE 12. The method as recited in EEE 1, wherein the first spatially filtered audio signal is generated by applying a first spatial filter to the two or more microphone signals of the two or more third microphones.

EEE 13. The method as recited in EEE 12, wherein the first spatial filter has high sensitivities to sounds from one or more right directions.

EEE 14. The method as recited in EEE 12, wherein the first spatial filter has low sensitivities to sounds from directions other than one or more right directions.

EEE 15. The method as recited in EEE 14, wherein the first spatial filter is predefined before binaural audio processing is performed by the mobile device.

EEE 16. The method as recited in EEE 1, wherein each of one or more of the front audio signal, the back audio signal, the second audio signal portion, or the third audio signal portion, is derived as a product of a specific audio signal and a specific transfer function.

EEE 17. The method as recited in EEE 16, wherein the specific transfer function is predefined before binaural audio processing is performed by the mobile device.

EEE 18. A media processing system configured to perform any one of the methods recited in EEEs 1-17.

EEE 19. An apparatus comprising a processor and configured to perform any one of the methods recited in EEEs 1-17.

EEE 20. A non-transitory computer readable storage medium, storing software instructions, which when executed by one or more processors cause performance of any one of the methods recited in EEEs 1-17.

It will be appreciated that the embodiments of the invention are not to be limited to the specific embodiments disclosed and that modifications and other embodiments are intended to be included within the scope of the appended claims. Although specific terms are used herein, they are used in a generic and descriptive sense only, and not for purposes of limitation.

The invention claimed is:

1. A computer-implemented method, comprising:

receiving a plurality of audio signals from a plurality of microphones of a mobile device, each audio signal in the plurality of audio signals being generated by a respective microphone in the plurality of microphones;

selecting one or more first microphones from among the plurality of microphones to generate a front audio signal $m_1$;

selecting one or more second microphones from among the plurality of microphones to generate a back audio signal $m_2$;

removing a first audio signal portion from the front audio signal $m_1$ to generate a modified front audio signal $S_f$, the first audio signal portion being determined based at least in part on the back audio signal $m_2$;

wherein the first audio signal portion is obtained by applying a back-to-front transfer function $H_{21}(z)$ to the back audio signal $m_2$; wherein the back-to-front transfer function $H_{21}(z)$ relates a first response of the one or more first microphones to a test back sound to a second response of the one or more second microphones to the test back sound, wherein the back-to-front transfer function $H_{21}(z)$ is determined beforehand based at least in part on the test back sound;

using the modified front audio signal $S_f$ in place of the front audio signal $m_1$ in subsequent audio processing operations.

2. The method as recited in claim 1, wherein each of the front audio signal and the back is derived from a respective single audio signal acquired by a single microphone in the plurality of microphones.

3. The method as recited in claim 1, wherein the plurality of microphones includes at least one of: an omnidirectional microphone or a directional microphone.

4. The method as recited in claim 1, wherein the one or more first microphones are selected from among the plurality of microphones based on a front direction as determined in an operational mode of the mobile device.

5. The method as recited in claim 4, wherein the operational mode of the mobile device is one of a regular operational mode, a selfie mode, an operational mode related to binaural audio processing, an operational mode related to surround audio processing, or an operational mode related to suppressing sounds in one or more specific spatial directions.

6. The method as recited in claim 1, wherein a right front signal R is generated based at least in part on removing a second audio signal portion from the modified front audio signal $S_f$; wherein a left front signal L is generated based at least in part on removing a third audio signal portion from the modified front audio signal $S_f$.

7. The method as recited in claim 6, wherein the second audio signal portion is removed from the modified front audio signal $S_f$ using a first spatial filter; wherein the third audio signal portion is removed from the modified front audio signal $S_f$ using a second spatial filter.

8. The method as recited in claim 6, wherein the second audio signal portion is removed from the modified front audio signal $S_f$ using a left-to-front transfer function $H_{lf}$; wherein the third audio signal portion is removed from the modified front audio signal $S_f$ using a right-to-front transfer function $H_{rf}$; wherein the left-to-front transfer function $H_{lf}$ and the right-to-front transfer function $H_{rf}$ are determined beforehand based at least in part on test left and right sounds.

9. The method as recited in claim 6, wherein the left-front audio signal is used to represent one of a left audio signal of a binaural audio signal, a left front audio signal of a surround audio signal or a right surround audio signal of a surround audio signal; wherein the right-front audio signal of the binaural audio signal is used to represent one of a right audio signal of a binaural audio signal, a right front audio signal of a surround audio signal or a left surround audio signal of a surround audio signal.

10. A system comprising:

one or more processors; and a non-transitory computer-readable medium storing instructions that, when executed by one or more processors, cause the one or more processors to perform operations comprising:

receiving a plurality of audio signals from a plurality of microphones of a mobile device, each audio signal in the plurality of audio signals being generated by a respective microphone in the plurality of microphones;

selecting one or more first microphones from among the plurality of microphones to generate a front audio signal $m_1$;

selecting one or more second microphones from among the plurality of microphones to generate a back audio signal $m_2$;

removing a first audio signal portion from the front audio signal $m_1$ to generate a modified front audio signal $S_f$, the first audio signal portion being determined based at least in part on the back audio signal $m_2$;

wherein the first audio signal portion is obtained by applying a back-to-front transfer function $H_{21}(z)$ to the back audio signal $m_2$; wherein the back-to-front transfer function $H_{21}(z)$ relates a first response of the one or more first microphones to a test back sound to a second response of the one or more second microphones to the test back sound, wherein the back-to-front transfer function $H_{21}(z)$ is determined beforehand based at least in part on the test back sound;

using the modified front audio signal $S_f$ in place of the front audio signal $m_1$ in subsequent audio processing operations.

11. The system as recited in claim 10, wherein each of the front audio signal and the back is derived from a respective single audio signal acquired by a single microphone in the plurality of microphones.

12. The system as recited in claim 10, wherein the plurality of microphones includes at least one of: an omnidirectional microphone or a directional microphone.

13. The system as recited in claim 10, wherein the one or more first microphones are selected from among the plurality of microphones based on a front direction as determined in an operational mode of the mobile device.

14. The system as recited in claim 13, wherein the operational mode of the mobile device is one of a regular operational mode, a selfie mode, an operational mode related to binaural audio processing, an operational mode related to surround audio processing, or an operational mode related to suppressing sounds in one or more specific spatial directions.

15. The system as recited in claim 10, wherein a right front signal R is generated based at least in part on removing a second audio signal portion from the modified front audio signal $S_f$; wherein a left front signal L is generated based at least in part on removing a third audio signal portion from the modified front audio signal $S_f$.

16. The system as recited in claim 15, wherein the second audio signal portion is removed from the modified front audio signal $S_f$ using a first spatial filter; wherein the third audio signal portion is removed from the modified front audio signal $S_f$ using a second spatial filter.

17. The system as recited in claim 15, wherein the second audio signal portion is removed from the modified front audio signal $S_f$ using a left-to-front transfer function $H_{lf}$; wherein the third audio signal portion is removed from the modified front audio signal $S_f$ using a right-to-front transfer function $H_{rf}$; wherein the left-to-front transfer function $H_{lf}$ and the right-to-front transfer function $H_{rf}$ are determined beforehand based at least in part on test left and right sounds.

18. The system as recited in claim 15, wherein the left-front audio signal is used to represent one of a left audio signal of a binaural audio signal, a left front audio signal of a surround audio signal or a right surround audio signal of a surround audio signal; wherein the right-front audio signal of the binaural audio signal is used to represent one of a right audio signal of a binaural audio signal, a right front audio signal of a surround audio signal or a left surround audio signal of a surround audio signal.

19. One or more non-transitory computer-readable media storing instructions that, when executed by one or more processors, cause the one or more processors to perform operations comprising:

receiving a plurality of audio signals from a plurality of microphones of a mobile device, each audio signal in the plurality of audio signals being generated by a respective microphone in the plurality of microphones;

selecting one or more first microphones from among the plurality of microphones to generate a front audio signal $m_1$;

selecting one or more second microphones from among the plurality of microphones to generate a back audio signal $m_2$;

removing a first audio signal portion from the front audio signal $m_1$ to generate a modified front audio signal $S_f$, the first audio signal portion being determined based at least in part on the back audio signal $m_2$;

wherein the first audio signal portion is obtained by applying a back-to-front transfer function $H_{21}(z)$ to the back audio signal $m_2$; wherein the back-to-front transfer function $H_{21}(z)$ relates a first response of the one or more first microphones to a test back sound to a second response of the one or more second microphones to the test back sound, wherein the back-to-front transfer function $H_{21}(z)$ is determined beforehand based at least in part on the test back sound;

using the modified front audio signal $S_f$ in place of the front audio signal $m_1$ in subsequent audio processing operations.

20. The media as recited in claim 19, wherein a right front signal R is generated based at least in part on removing a second audio signal portion from the modified front audio signal $S_f$; wherein a left front signal L is generated based at least in part on removing a third audio signal portion from the modified front audio signal $S_f$.

* * * * *